(12) United States Patent
Suzuki et al.

(10) Patent No.: US 10,303,433 B2
(45) Date of Patent: May 28, 2019

(54) PORTABLE TERMINAL DEVICE AND INFORMATION PROCESSING SYSTEM

(71) Applicant: MAXELL, LTD., Kyoto (JP)

(72) Inventors: Motoyuki Suzuki, Ibaraki (JP); Hideo Nishijima, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 14/651,002

(22) PCT Filed: Dec. 18, 2013

(86) PCT No.: PCT/JP2013/083815
§ 371 (c)(1),
(2) Date: Jun. 10, 2015

(87) PCT Pub. No.: WO2014/106927
PCT Pub. Date: Jul. 10, 2014

(65) Prior Publication Data
US 2015/0324168 A1    Nov. 12, 2015

(30) Foreign Application Priority Data

Jan. 7, 2013   (JP) ................................. 2013-000297

(51) Int. Cl.
*G06F 3/16*    (2006.01)
*G06F 3/00*    (2006.01)
(Continued)

(52) U.S. Cl.
CPC .............. *G06F 3/167* (2013.01); *G06F 3/005* (2013.01); *G06F 3/011* (2013.01); *G06F 3/012* (2013.01);
(Continued)

(58) Field of Classification Search
CPC .. G06K 9/228; G06K 9/00221; G06K 9/6293; G06F 3/0488; G06F 1/3231;
(Continued)

(56) References Cited

U.S. PATENT DOCUMENTS 6,014,625 A    1/2000 Lee
8,700,392 B1 *  4/2014 Hart ........................ G10L 15/25
                                                704/231
(Continued)

FOREIGN PATENT DOCUMENTS

CN    1189059 A     7/1998
JP    2001-358828 A   12/2001
(Continued)

OTHER PUBLICATIONS

International Search Report of PCT/JP2013/083815.
(Continued)

*Primary Examiner* — Robert J Michaud
(74) *Attorney, Agent, or Firm* — Mattingly & Malur, PC

(57) ABSTRACT

This invention is provided with: a memory unit for storing lip movement recognition data; an imaging unit for capturing a video including at least the lip portion of the operator; a lip movement recognition unit for performing a comparison between data representing the movement of the lip portion of the operator obtained from the imaging unit and the lip movement recognition data, and thereby recognizing the operation to execute; and a controller for performing an operation executable in accordance with the lip movement recognition unit.

4 Claims, 35 Drawing Sheets

(51) Int. Cl.
*G10L 15/25* (2013.01)
*G06K 9/00* (2006.01)
*G06F 3/01* (2006.01)
*G06F 3/0482* (2013.01)
*G10L 15/22* (2006.01)

(52) U.S. Cl.
CPC ....... *G06F 3/0482* (2013.01); *G06K 9/00335* (2013.01); *G10L 15/25* (2013.01); *G06F 2203/0381* (2013.01); *G10L 2015/223* (2013.01); *H04M 2250/52* (2013.01); *H04M 2250/74* (2013.01)

(58) Field of Classification Search
CPC ........ G06F 21/32; G06F 3/0484; G06F 3/011; G06F 3/012; G06F 3/167; H04M 1/725
See application file for complete search history.

(56) References Cited

U.S. PATENT DOCUMENTS

| | | | |
|---|---|---|---|
| 2007/0048695 A1* | 3/2007 | Huang | G09B 19/06 434/156 |
| 2009/0018831 A1 | 1/2009 | Morita | |
| 2009/0037623 A1* | 2/2009 | Ghassabian | G06F 1/1616 710/67 |
| 2010/0296707 A1* | 11/2010 | Murakami | G06F 1/3231 382/118 |
| 2011/0071830 A1* | 3/2011 | Kim | G01C 21/3602 704/246 |
| 2011/0257971 A1* | 10/2011 | Morrison | G06K 9/00221 704/233 |
| 2013/0054243 A1 | 2/2013 | Ichikawa | |
| 2013/0268405 A1* | 10/2013 | Yeh | G06Q 30/02 705/26.61 |
| 2013/0268865 A1* | 10/2013 | Rhim | G06F 3/0484 715/751 |
| 2014/0214424 A1* | 7/2014 | Wang | G06K 9/00288 704/246 |

FOREIGN PATENT DOCUMENTS

| | | |
|---|---|---|
| JP | 2002-368870 A | 12/2002 |
| JP | 2004-246095 A | 9/2004 |
| JP | 2005-184485 A | 7/2005 |
| JP | 2007-041089 A | 2/2007 |
| JP | 2007-280179 A | 10/2007 |
| JP | 2010-26731 A | 2/2010 |
| JP | 2011-49910 A | 3/2011 |
| JP | 2011-186994 A | 9/2011 |
| WO | 2006/080161 A1 | 8/2006 |
| WO | 2007/049569 A1 | 5/2007 |
| WO | 2011/037264 A1 | 3/2011 |

OTHER PUBLICATIONS

Japanese Office Action received in corresponding Japanese Application No. 2016-046542 dated Oct. 11, 2016 and partial translation thereof.

Japanese Office Action received in corresponding Japanese Application No. 2016-046542 dated Jan. 17, 2017.

Chinese Office Action received in corresponding Chinese Application No. 201380064683.0 dated Apr. 18, 2017 with partial translation.

\* cited by examiner

FIG. 3

| STATE OF TERMINAL | OPERATION OPTION | OPERATION OBJECT SELECTION |
|---|---|---|
| HOME | APPLICATION | YES |
| | MAIL | YES |
| | MUSIC REPRODUCTION | YES |
| | VIDEO REPRODUCTION | YES |
| | PHOTO | YES |
| | SETTING | YES |
| MUSIC REPRODUCTION | STOP | NO |
| | FORWARD SKIP | NO |
| | BACKWARD SKIP | NO |
| .. | .. | .. |
| | .. | .. |

FIG. 6
(a) 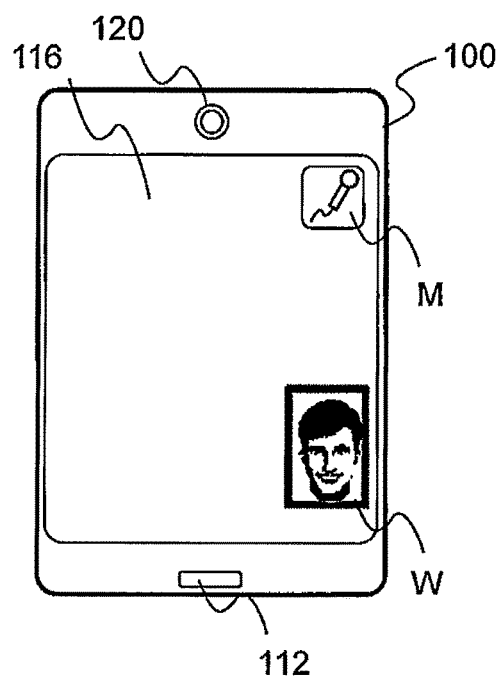
(b) 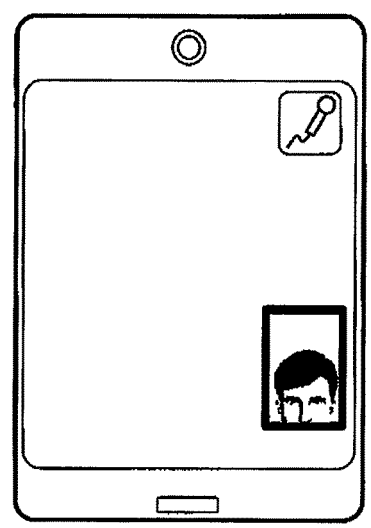

FIG. 11
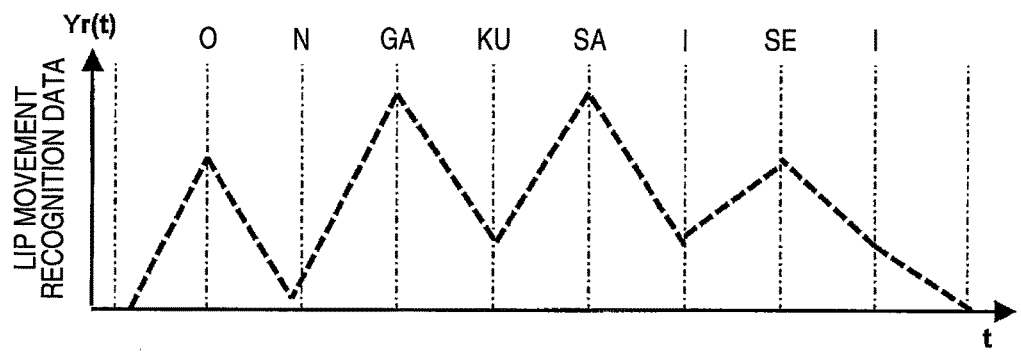
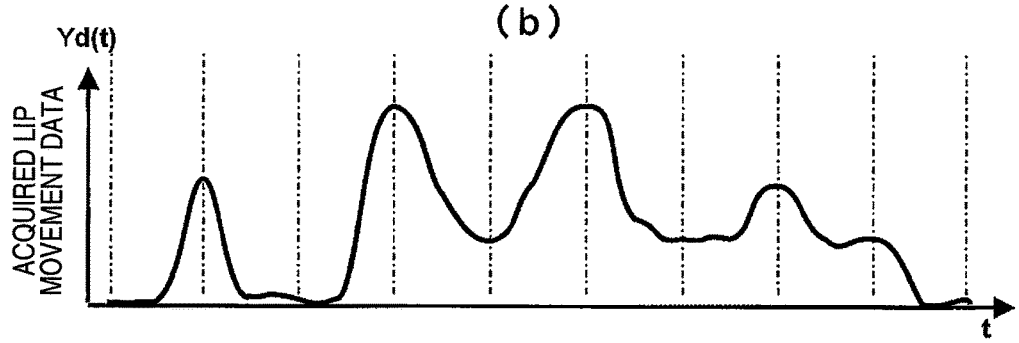
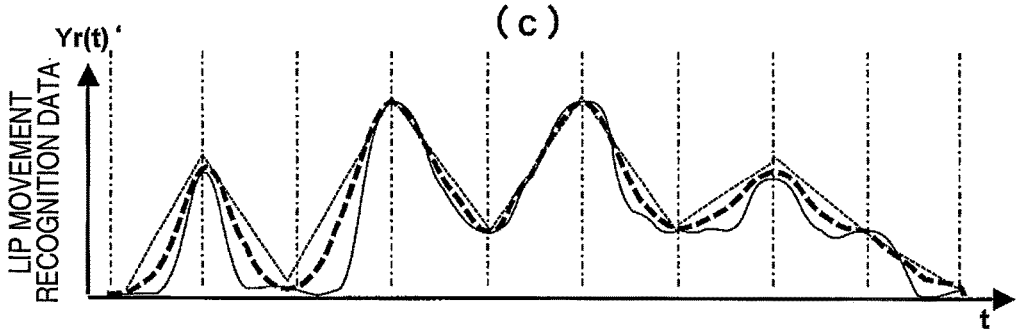

FIG. 14

| OPERATION | CATEGORY OPTION |
|---|---|
| MUSIC REPRODUCTION | MUSIC NAME |
| | ARTIST |
| | ALBUM |
| | GENRE |
| PHOTO | TITLE |
| | DATE |
| | PLACE |
| .. | .. |

FIG. 22

| STATE OF TERMINAL | OPERATION OPTION | VOWEL SEQUENCE | OPERATION OBJECT SELECTION |
|---|---|---|---|
| HOME | APPLICATION (APURI) | A-U-I | YES |
| | MAIL (MEERU) | E-E-U | YES |
| | MUSIC REPRODUCTION (ONGAKU SAISEI) | O-A-U-A-I-E-I | YES |
| | VIDEO REPRODUCTION (BIDEO SAISEI) | I-E-O-A-I-E-I | YES |
| | PHOTO (FOTO) | O-O | YES |
| | SETTING (SETTEI) | E-E-I | YES |
| MUSIC REPRODUC- TION | STOP (TEISI) | E-I-I | NO |
| | FORWARD SKIP (MAE SUKIPPU) | A-E-U-I-U | NO |
| | BACKWARD SKIP (USIRO SUKIPPU) | U-I-O-U-I-U | NO |
| .. | .. | .. | .. |
| | .. | .. | .. |

FIG. 25

|   | X | Y |
|---|---|---|
| A | 3 (LARGE) | 3 (LARGE) |
| I | 3 (LARGE) | 1 (SMALL) |
| U | 1 (SMALL) | 1 (SMALL) |
| E | 2 (MEDIUM) | 2 (MEDIUM) |
| O | 1 (SMALL) | 2 (MEDIUM) |

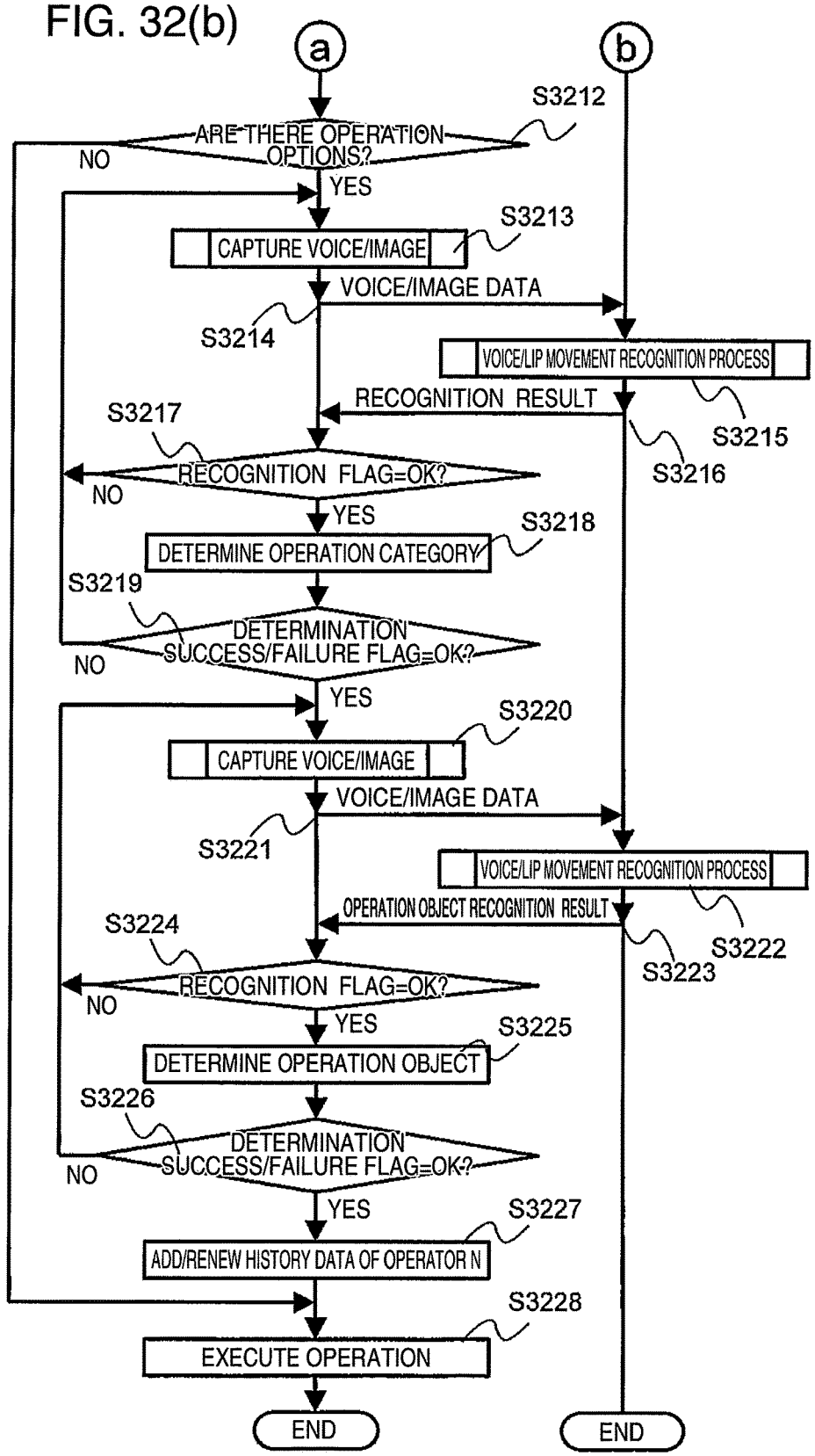

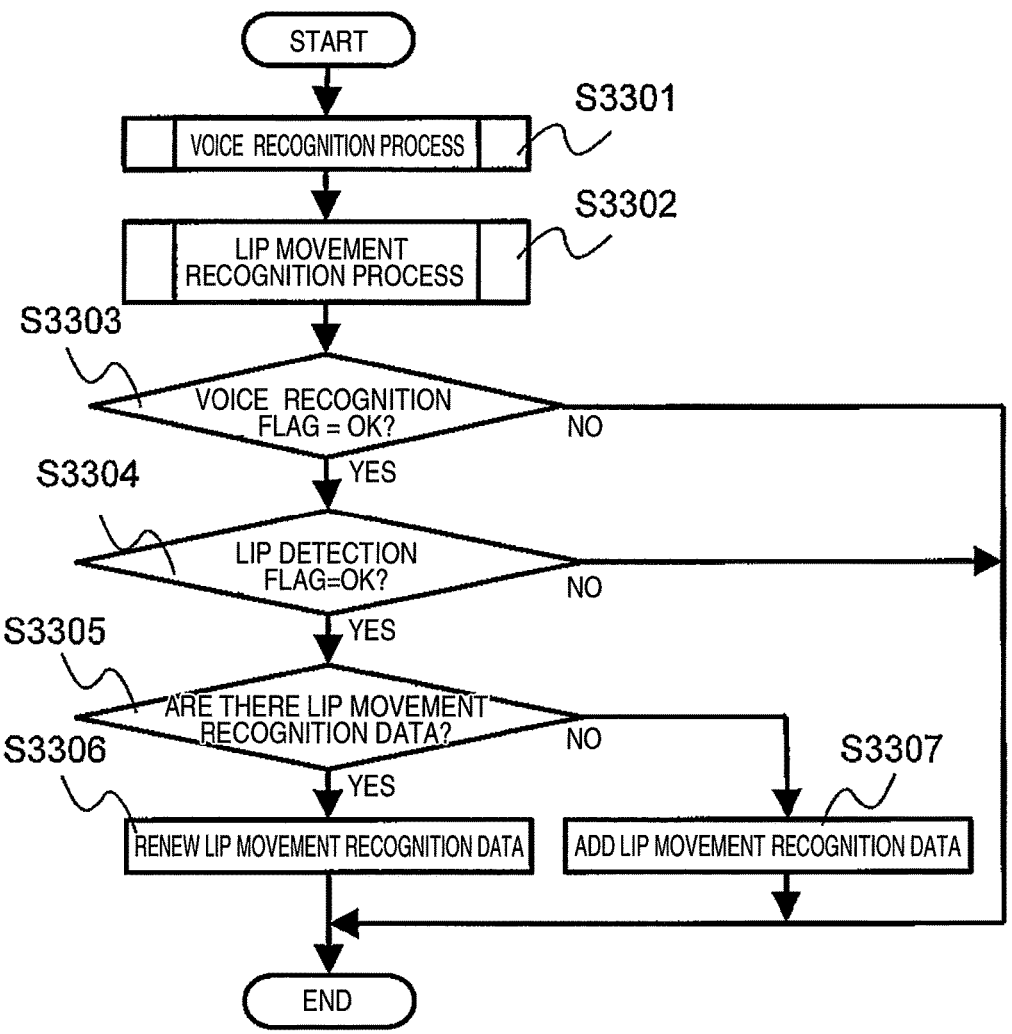

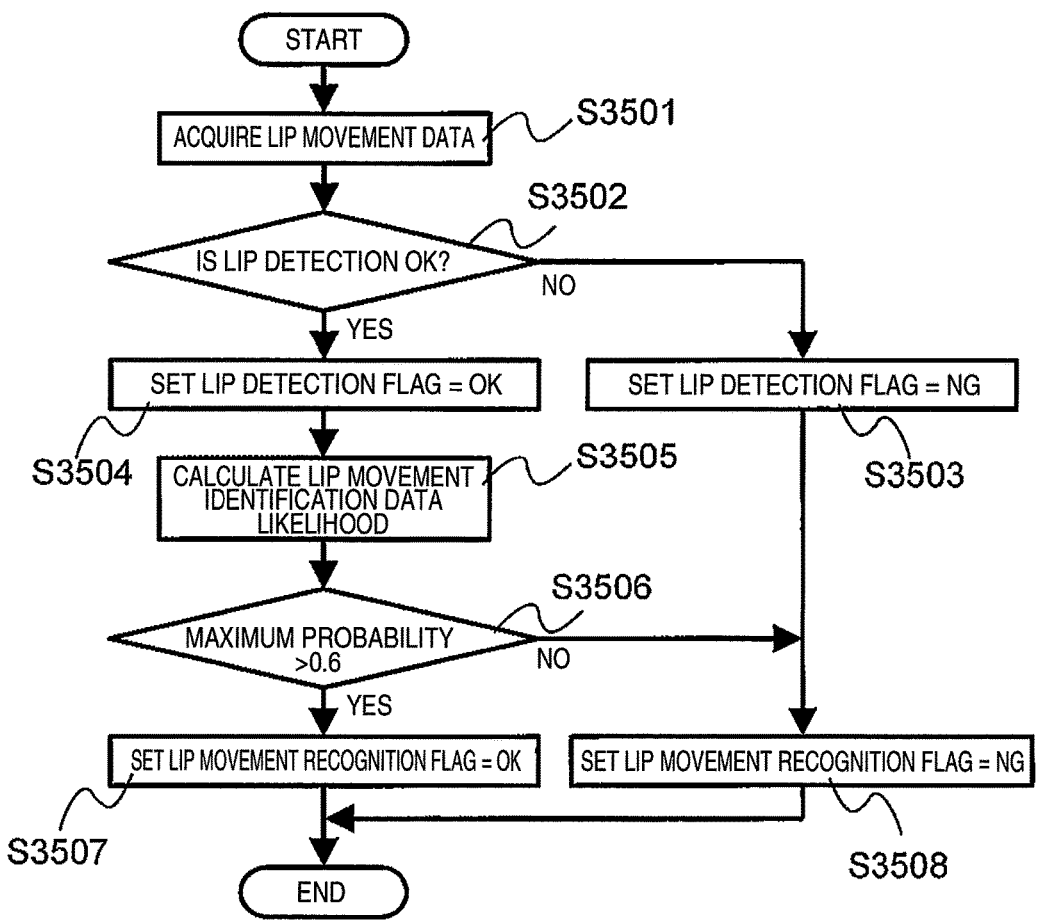

PORTABLE TERMINAL DEVICE AND INFORMATION PROCESSING SYSTEM

TECHNICAL FIELD

The present invention relates to a portable terminal device and an information processing system.

BACKGROUND ART

In recent years, with respect to terminals for a cellular phone, car navigation system, home AV appliance and the like, user interfaces which are easily operable by recognizing the voice without using an operation means such as a keyboard and mouse have been watched.

CITATION LIST

Patent Literature

Patent Literature 1: JP-A-2007-041089

SUMMARY OF INVENTION

Technical Problem

However, with such terminals that execute operation by voice recognition, a problem occurs that the terminals cannot be operated in an environment uttering the voice is not preferable such as a library and in a very noisy environment.

In view of the problem described above, the object of the present invention is to provide a portable terminal device and an information processing system which are more user-friendly even in an environment where uttering the voice is not preferable and a very noisy environment.

Solution to Problem

As a means for solving the problem described above, for example, the configurations described in claims can be employed. As an example, such configuration is used which includes a storage unit that stores lip movement recognition data, an imaging unit that shoots images including at least a lip portion of an operator, a lip movement recognition unit that compares data representing a movement of the lip portion of the operator obtained from the imaging unit and the lip movement recognition data, and thereby recognizes operation to be executed, and a controller that executes executable operation according to the lip movement recognition unit.

Advantageous Effects of Invention

By using the technology of the present invention, a portable terminal device and an information processing system which are more user-friendly even in an environment where uttering the voice is not preferable and a very noisy environment can be provided.

BRIEF DESCRIPTION OF DRAWINGS

FIG. 3 is a drawing showing an example of an operation option table that corresponds to a state of the portable terminal.

FIG. 6 is a drawing showing a display example of a portable terminal in a process for capturing the voice and image of the operator.

FIG. 11 is a drawing explaining an example of a lip movement recognition data renewal process.

FIG. 14 is a drawing showing an example of a table of the category options that correspond to operation.

FIG. 22 is an example of a table of a vowel sequence corresponding to an operation option.

FIG. 25 is a drawing showing an example of a table of the size of the lips which corresponds to the vowels.

FIG. 32(b) is a flowchart showing an example of the process of the information processing system of the present invention.

FIG. 33 is a flowchart showing an example of the voice/lip movement recognition process in the voice/lip movement recognition server.

FIG. 35 is a flowchart showing an example of the lip movement recognition process in the voice/lip movement recognition server.

DESCRIPTION OF EMBODIMENTS

In the following, examples of embodiments of the present invention will be described using the drawings.
Embodiment 1

Figure 1:
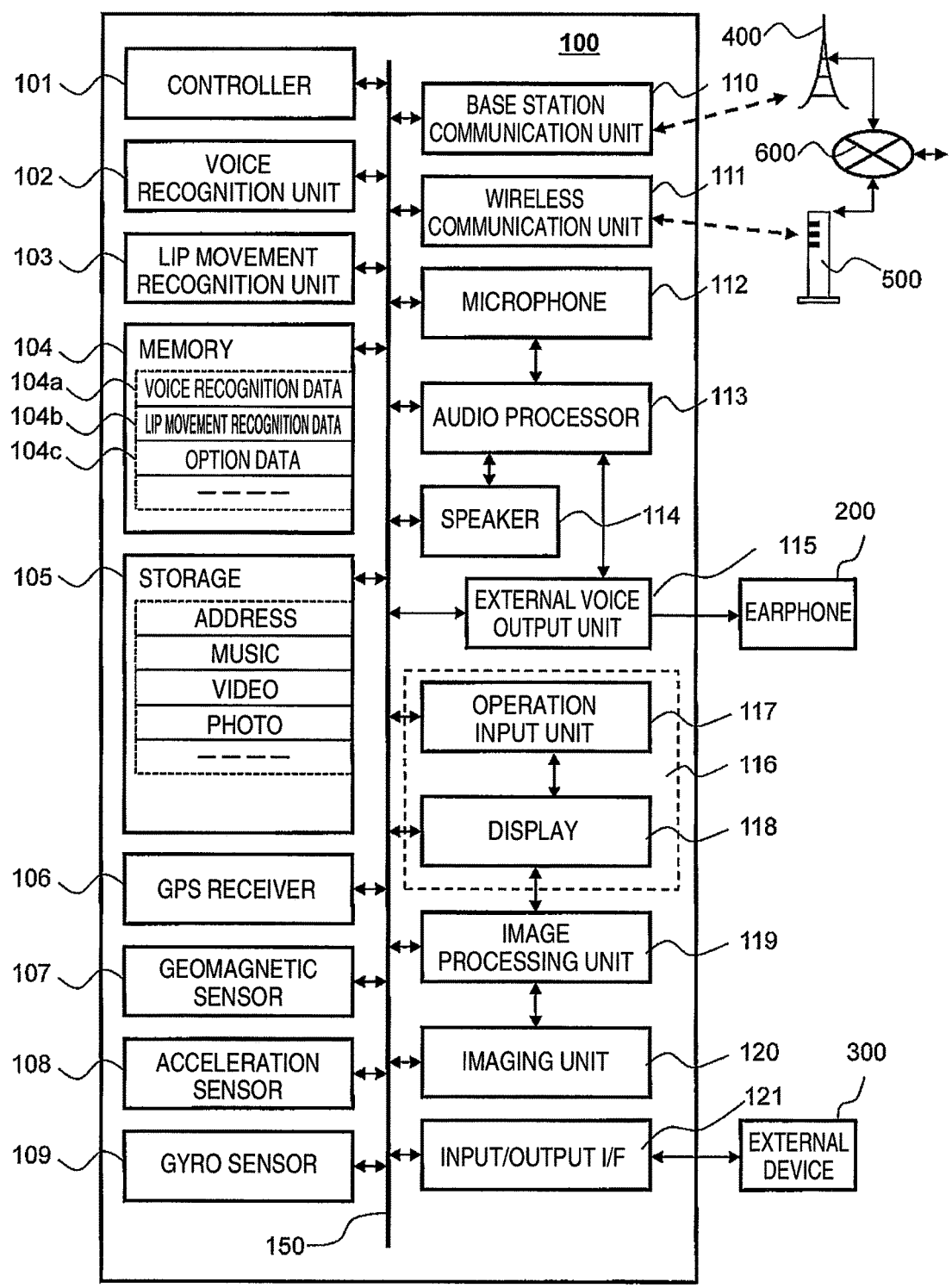
FIG. 1 is a block diagram showing a configuration example of a portable terminal device according to an embodiment of the present invention.

FIG. 1 is a block diagram showing an internal configuration example of a portable terminal device 100 by an embodiment of the present invention.

Here, description will be made with an example of a case of a smart phone. The portable terminal 100 includes a controller 101, a voice recognition unit 102, a lip movement recognition unit 103, a memory 104, a storage 105, a GPS (Global Positioning System) receiver 106, a geomagnetic sensor 107, an acceleration sensor 108, a gyro sensor 109, a base station communication unit 110, a wireless communication unit 111, a microphone 112, an audio processor 113, a speaker 114, a voice output unit 115, a touch panel 116, an operation input unit 117, a display 118, an image processing unit 119, an imaging unit 120, and an input/output OF 121, and each of them and a bus 150 are connected with each other.

The base station communication unit 110 is a communication interface such as W-CDMA (Wideband Code Division Multiple Access) and GSM (Registered trademark) (Global System for Mobile communications) which execute long distance wireless communication with a base station 400. With the base station communication unit 110, it is also possible to connect with an external network 600 through the base station 500, and to transmit/receive information.

The controller 101 is formed of a CPU (Central Processing Unit) and the like, and controls respective constituting units and executes various processes by executing programs stored in the memory 104.

The voice recognition unit 102 recognizes the voice of the operator captured from the microphone 112 through the audio processor 113, and recognizes the operation instructed by the voice. Also, the lip movement recognition unit 103 recognizes the images including the lips of the operator captured from the imaging unit 120 through the image processing unit 119, and recognizes the operation instructed by the lip movement of the operator.

The controller 101 selects whether the operation is to be executed by the result recognized from the voice of the operator or the operation is to be executed by the result recognized from the lip movement of the operator, and executes the operation based on the result selected.

The memory 104 is a flush memory and the like, and stores programs, data, and the like. The data used for recognition by the voice recognition unit 102 and the lip movement recognition unit 103 described above are stored in predetermined areas 104a, 104b of the memory 104.

Also, the portable terminal 100 includes the storage 105 such as a memory card, and mail addresses, data of music, video, and photos, and the like can be stored also in the storage 105.

The programs or the data stored in the memory 104 or the storage 105 can be renewed and added from time to time by that the base station communication unit 110 executes wireless communication with the base station and downloads the programs or the data from an external server and the like not illustrated. Further, it is also possible to renew and add the data, programs and the like by connecting with an external device 300 such as a personal computer through the input/output I/F 121.

The GPS receiver 106 receives signals from GPS satellites overhead. Thereby, the current position of the portable terminal 100 can be detected.

The geomagnetic sensor 107 is a sensor that detects the direction to which the portable terminal 100 faces.

The acceleration sensor 108 is a sensor that detects the acceleration of the portable terminal 100, and the gyro sensor 109 is a sensor that detects the angular velocity of the portable terminal 100. The inclination and movement of the portable terminal 100 can be detected in detail by them.

The wireless communication unit 111 is a communication interface that executes wireless communication by a wireless LAN of IEEE802.11a/b/n and the like, and can connect with the external network 600 through a wireless router 500.

The microphone 112 inputs the voice of the outside, and the speaker 111 outputs the voice to the outside. The external voice output unit 115 outputs the voice by connecting an earphone 200. The voice inputted/outputted is subjected to audio processing by the audio processor 113.

A touch panel 116 includes the operation input unit 117 and the display 118. The display 118 is an LCD and the like, displays a picture or image, and includes the operation input unit 117 such as a touch pad on the display surface thereof.

The operation input unit 117 is a touch pad of a capacitance type for example, and detects the touch operation (hereinafter referred to as "touch") by a finger, touch pen and the like as an operation input.

The imaging unit 120 is a camera and the like. The image displayed on the display 118 and the image inputted from the imaging unit 120 are processed by the image processing unit 119.

The input/output I/F 121 is a USB (Universal Serial Bus) and the like for example, and is an interface that transmits/receives data to/from the external device 300.

Figure 2:
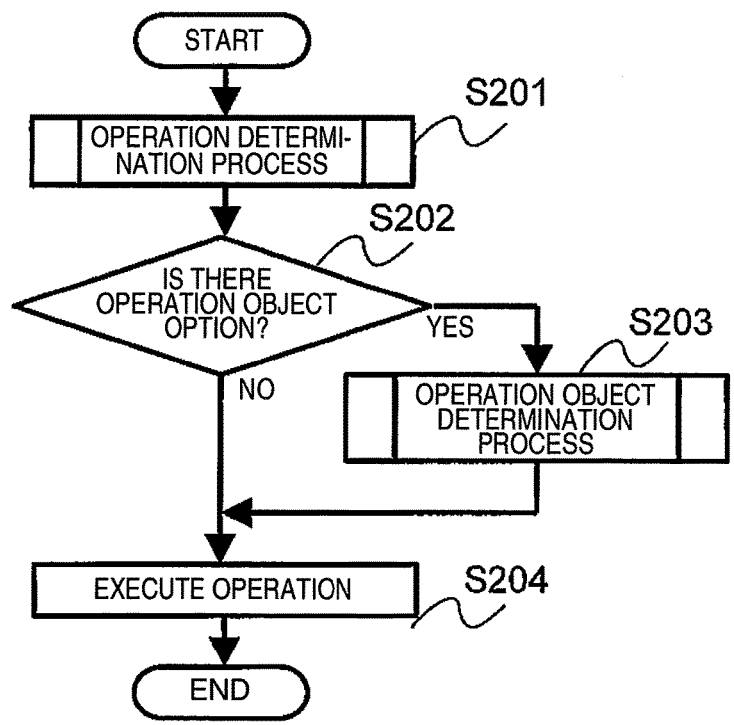
FIG. 2 is an example of a flowchart of a process for executing operation of a portable terminal by voice recognition or lip movement recognition.

Next, an example of a flowchart of a process of the controller 101 is shown in FIG. 2 which is for executing operation by voice recognition or lip movement recognition in the portable terminal device 100.

Figure 4:
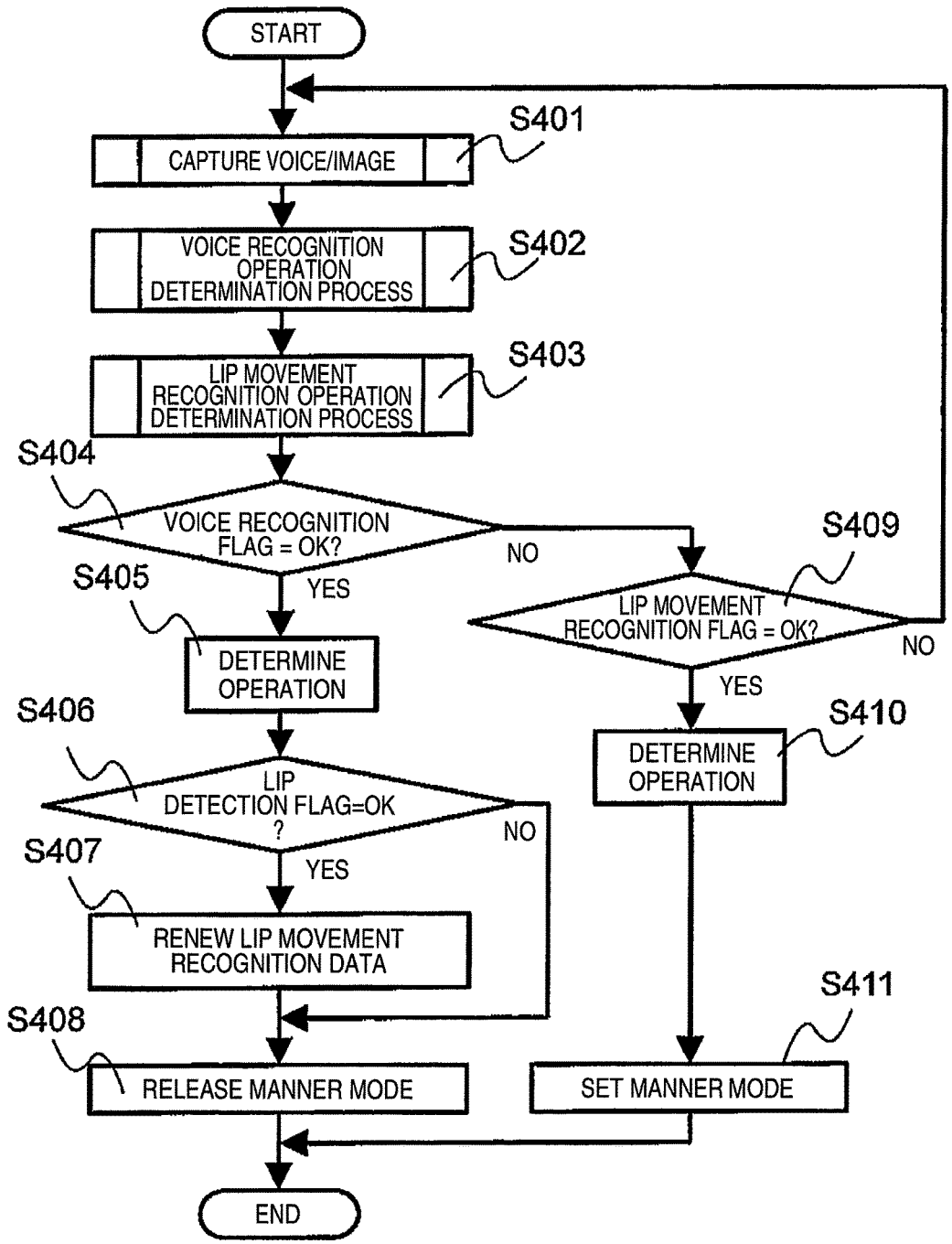
FIG. 4 is an example of a flowchart explaining an operation determination process.

In FIG. 2, first, what kind of operation is to be executed is determined out of options of executable operations by the state of the portable terminal device 100 (S201). An example of a table of the executable operations corresponding to the state of the portable terminal device 100 is shown in FIG. 3. For example, in a state that a home screen is displayed, "music reproduction", "mail" and the like become operation options, and, in a state that music is reproduced, "stop", "forward skip" and the like become operation options. Next, a branch process is executed according to whether selection of the object of the operation is needed or not (S202). For example, when "music reproduction" is to be executed as the operation, selection of the object (music piece and the like) of operation (music reproduction and the like) becomes necessary such as which music piece is to be reproduced. Also, when "stop" is to be executed as the operation during music reproduction, selection of the object of the operation (stop and the like) is not necessary. When there is selection of the operation object (Yes), a process S203 for determining the operation object is executed, and the operation (music reproduction for example) is executed for the selected operation object (music piece for example) (S204). When there is not selection of the operation object in the branch process S202 (No), operation (stop for example) is executed. The table data of the operation options corresponding to the state of the portable terminal device shown in FIG. 3 are stored in a memory area 104c. FIG. 4 is a flowchart showing an example of the operation determination process S201.

In FIG. 4, first, a voice is captured from the microphone 112 through the audio processor 113, and the image including at least the lip portion of the operator is captured from the imaging unit 120 through the image processing unit 119 (S401). Next, a voice recognition operation determination process S402 is executed by the voice recognition unit 102, and a lip movement recognition operation determination process S403 is executed by the lip movement recognition unit 103. In a branch process S404, whether the voice recognition has been successful in the voice recognition operation determination process S402 is determined by a voice recognition flag. When the voice recognition has been successful (Yes), which operation is to be executed is determined (S405) based on the result recognized in the voice recognition operation determination process S402. Next, in a branch process 406, the image is captured without that the lip portion departs from the imaging range, and whether lip movement data has been successfully acquired is determined by a lip detection flag. When the lip movement data has been successfully acquired (Yes), the lip movement recognition data of the memory area 104b is renewed corresponding to the voice recognition result (S407), manner mode is released (S408), and the process is finished. In operation of the manner mode release and onward, operation guide by the voice from the speaker 114 (or from the earphone 200 through the external voice output unit 115 when the earphone 200 has been connected), incoming call guiding by sound, and the like are executed. On the other hand, when it is determined that acquisition of the lip movement data has failed by the lip detection flag in the branch process S406 (No), the lip movement recognition data of the memory area 104b is not renewed, the manner mode is released (S408), and the process is finished.

When it is determined by the voice recognition flag that the voice recognition has failed in the branch process S404 (No), whether the recognition has been successful in the lip movement recognition operation determination process S403 is determined by a lip movement recognition flag in a branch process 409. When the lip movement recognition has been successful (Yes), which operation is to be executed is determined based on the result recognized in the lip movement recognition operation determination process S403 (S410), the manner mode is set (S411), and the process is finished. In the manner mode, the output from the speaker 114 is put off, and operation guide or incoming call guiding or the like by the screen display without the sound is executed. On the other hand, when it is determined that the lip movement recognition has failed by the lip movement recognition flag in the branch process S409 (No), the process returns again to the process for acquiring the voice and image (S401).

By the process described above, when the voice recognition operation determination process has been successful, the operation is determined according to the voice recognition result, and when the voice recognition operation determination process has failed and the lip movement recognition operation determination process has been successful, the operation is determined according to the lip movement recognition. Also, when the voice recognition has been successful and acquisition of the lip movement data has been successful, the lip movement recognition data of the memory area 104b is renewed.

As described above, even when the voice recognition operation determination process cannot be executed in a very noisy environment of the bustle and the like and an environment of a library and the like where uttering is not appropriate, which operation is to be executed can be determined by executing the lip movement recognition operation determination process. Also, setting/releasing of the manner mode can be automatically executed by the process of the voice recognition and the lip movement recognition.

Figure 5:
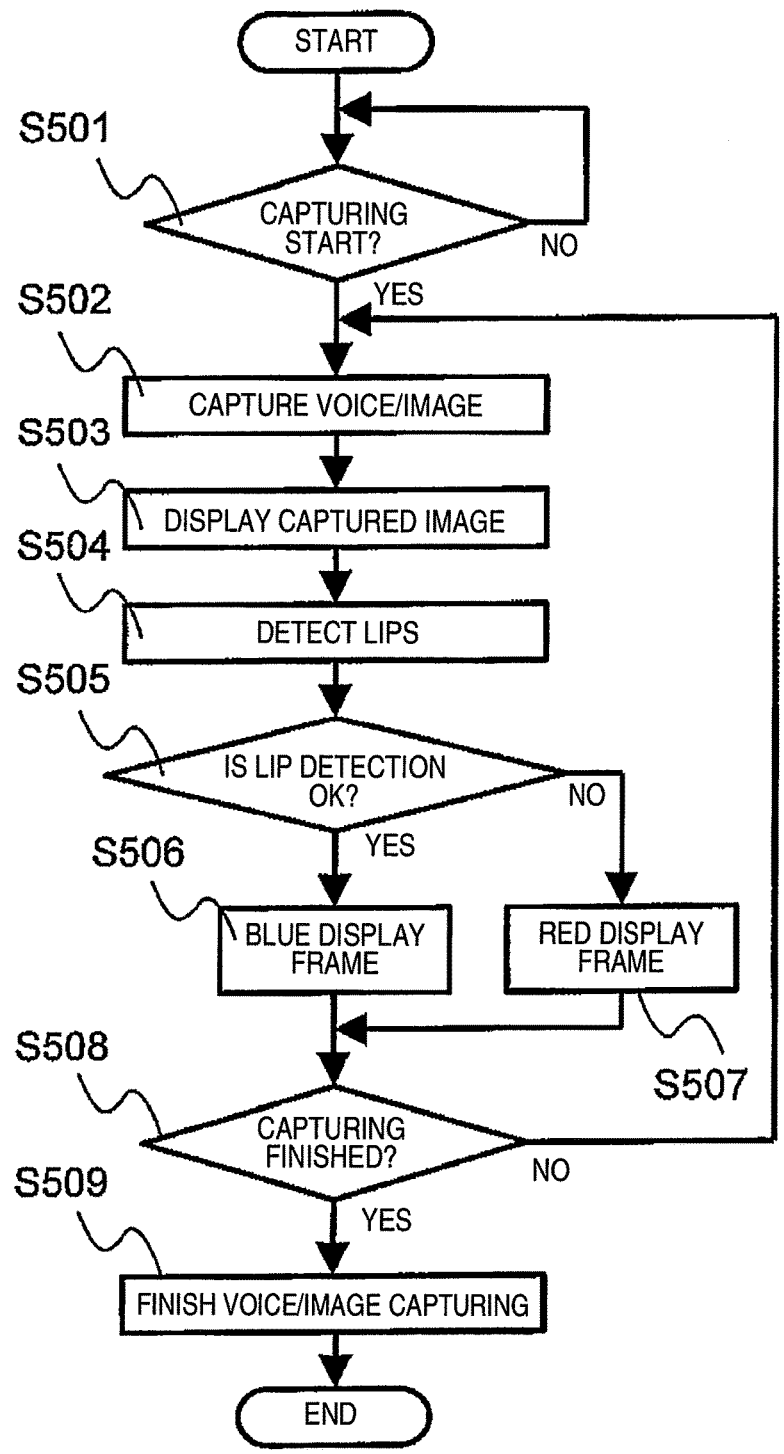
FIG. 5 is an example of a flowchart explaining a process for capturing the voice and image of an operator.

FIG. 5 is a flowchart showing an example of the process S401 for capturing the voice and the images including the lip portion.

In FIG. 5, first, start of capturing of the voice and image is determined (S501). As the determination of the start of capturing, for example, determination is made by whether a predetermined portion M of the touch panel 116 of the portable terminal device 100 shown in FIG. 6 has been touched or not. When it is determined that the predetermined portion M has been touched (Yes), capturing of the voice and the image of the lip portion (S502) is started, and the captured image is displayed at a predetermined portion W of the display 118 of the portable terminal device 100 (S503). Whether the lip portion has not departed from the imaging range is detected by the lip movement detection unit 103 based on the captured image (S504). In a branch process S505, a branch process is executed by the lip detection result, and, when the lip portion has not departed from the imaging range as shown in FIG. 6(a) (Yes), for example, the display frame of the predetermined portion W of the display 118 is colored blue (S506). When it is determined that the lip portion has departed from the imaging range as shown in FIG. 6(b) (No), for example, the display frame of the predetermined portion W of the display 118 is colored red (S507). In a branch process S508, finish of the capturing of the voice and images is determined. As the determination of the finish of the capturing, determination is made by whether the predetermined portion M of the touch panel 116 of the portable terminal device 100 has been touched again or not. When it is determined that the predetermined portion M has not been touched (No), the process returns to S502, and the capturing of the voice and images is continued. When it is determined that the predetermined portion M has been touched (Yes), the capturing of the voice and the images of the lip portion is finished (S509), and the process is finished.

By the process described above, the voice and the images of the lip portion are captured. Also, by the display of the captured image and the color of the display frame, whether the lip portion has departed from the imaging range can be easily determined, and the operator can correct the imaging position. Further, here, as a method for notifying the operator of whether the image of the lip portion has departed or not from the imaging range, it is configured to change the color of the display frame, however, it is also possible to notify the operator of the same by other displaying methods.

Figure 7:
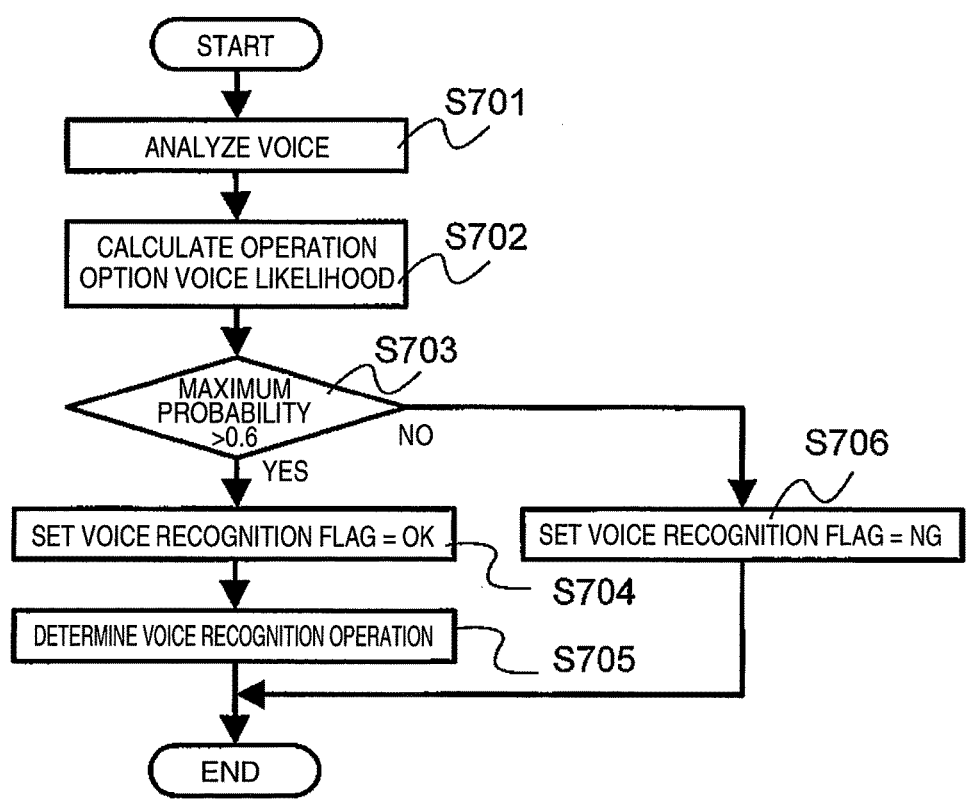
FIG. 7 is an example of a flowchart explaining a voice recognition operation determination process.

Next, an example of a flowchart of the voice recognition operation determination process S402 in the voice recognition unit 102 is shown in FIG. 7.

In FIG. 7, voice analysis is executed first, and the time series pattern of the characteristic parameter of an input voice (more specifically, the time series of a spectrum and cepstrum) is extracted (S701). Next, the likelihood for the voice recognition data corresponding to the operation options stored in the memory area 104a as an acoustic model by HMM (Hidden Markov Model) (S702) is calculated. In a branch process S703, when the maximum probability (maximum likelihood) of the result of the likelihood calculation is equal to or greater than a predetermined value (here, the value is set to 0.6 as an example) (Yes), a voice recognition flag is set to OK (S704), an operation option that gives the maximum probability is determined as the recognition result (S705), and the process is finished. On the other hand, when it is determined to be No in the branch process S703, it is determined that the voice recognition has failed due to a noise and the like, the voice recognition flag is set to NG (S706), and the process is finished.

Next, the lip movement recognition operation determination process S403 in the lip movement recognition unit 103 will be described using an example of FIG. 8.

Figure 8:
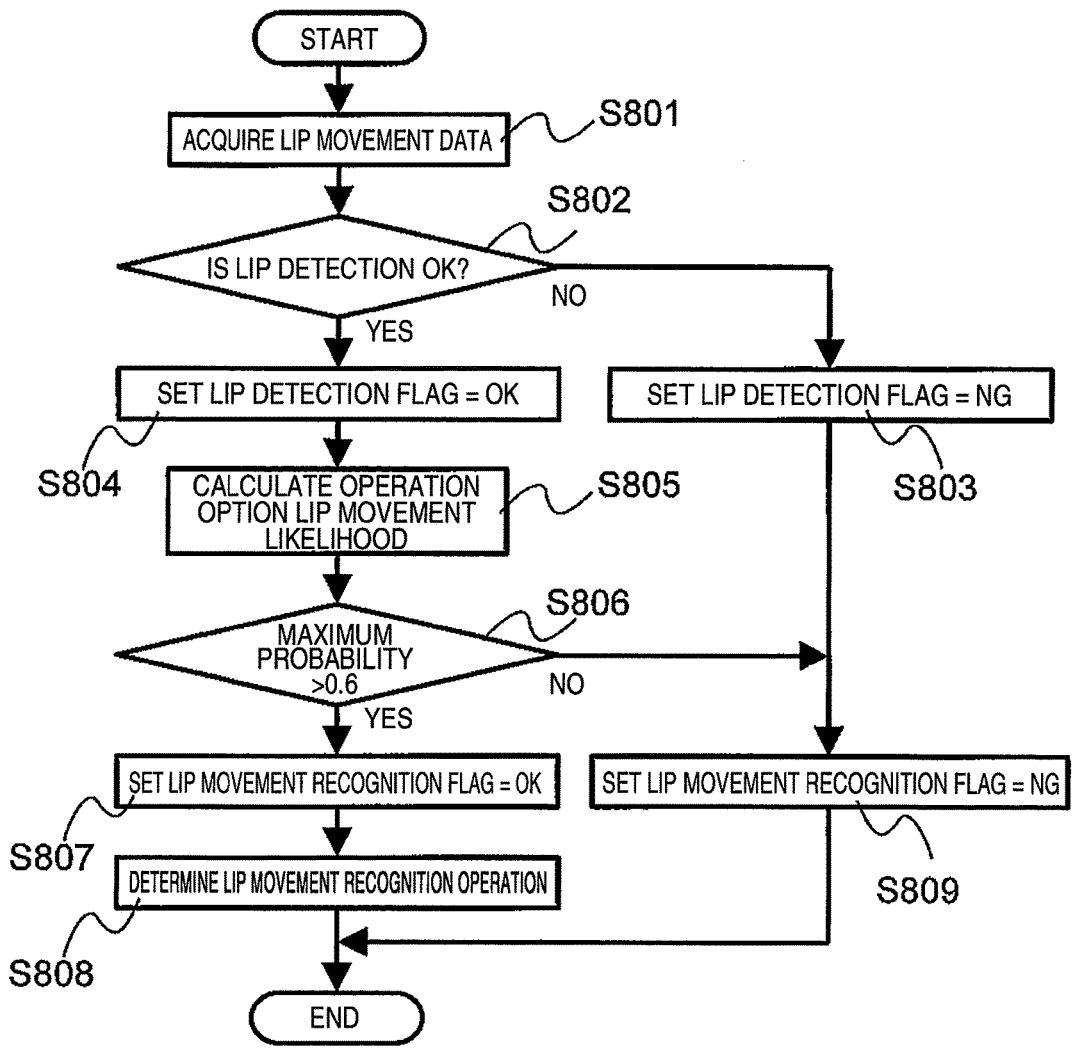
FIG. 8 is an example of a flowchart explaining a lip movement recognition operation determination process.
Figure 9:
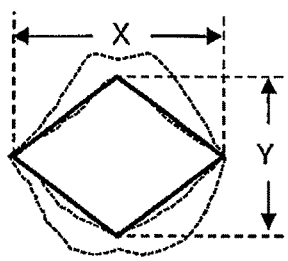
FIG. 9 is a drawing showing an example of the definition of the size of lips.

In the flowchart of FIG. 8, first, a movement of the lips is detected from the image of the lip movement inputted, and the lip movement data is acquired (S801). As the data of the lip movement, for example, a temporal change of the lateral size X of the lips and the vertical size Y of the lips is detected as shown in FIG. 9. When the lip portion departs from the imaging range, the lip portion cannot be detected from the image inputted, and acquisition of the lip movement data fails in the lip movement data acquisition process S801, it is determined to be No in a branch process 802, the lip detection flag and the lip movement recognition flag are set to NG (S803, S809), and the process is finished. On the other hand, when the lip movement data has been successfully acquired from the image inputted, it is determined to be Yes in the branch process 802, and the lip detection flag is set to OK (S804). Next, the likelihood of the lip movement data acquired and the lip movement recognition data corresponding to the operation options stored in the memory range 104b is calculated (S805). In a branch process S806, when the maximum probability (maximum likelihood) of the result of the likelihood calculation is equal to or greater than a predetermined value (here, the value is set to 0.6 as an example) (Yes), the lip movement recognition flag is set to OK (S807), an operation option that gives the maximum probability is determined as the recognition result (S808), and the process is finished. On the other hand, when it is determined to be No in the branch process S806, the lip movement recognition flag is set to NG (S809), and the process is finished.

Figure 10:
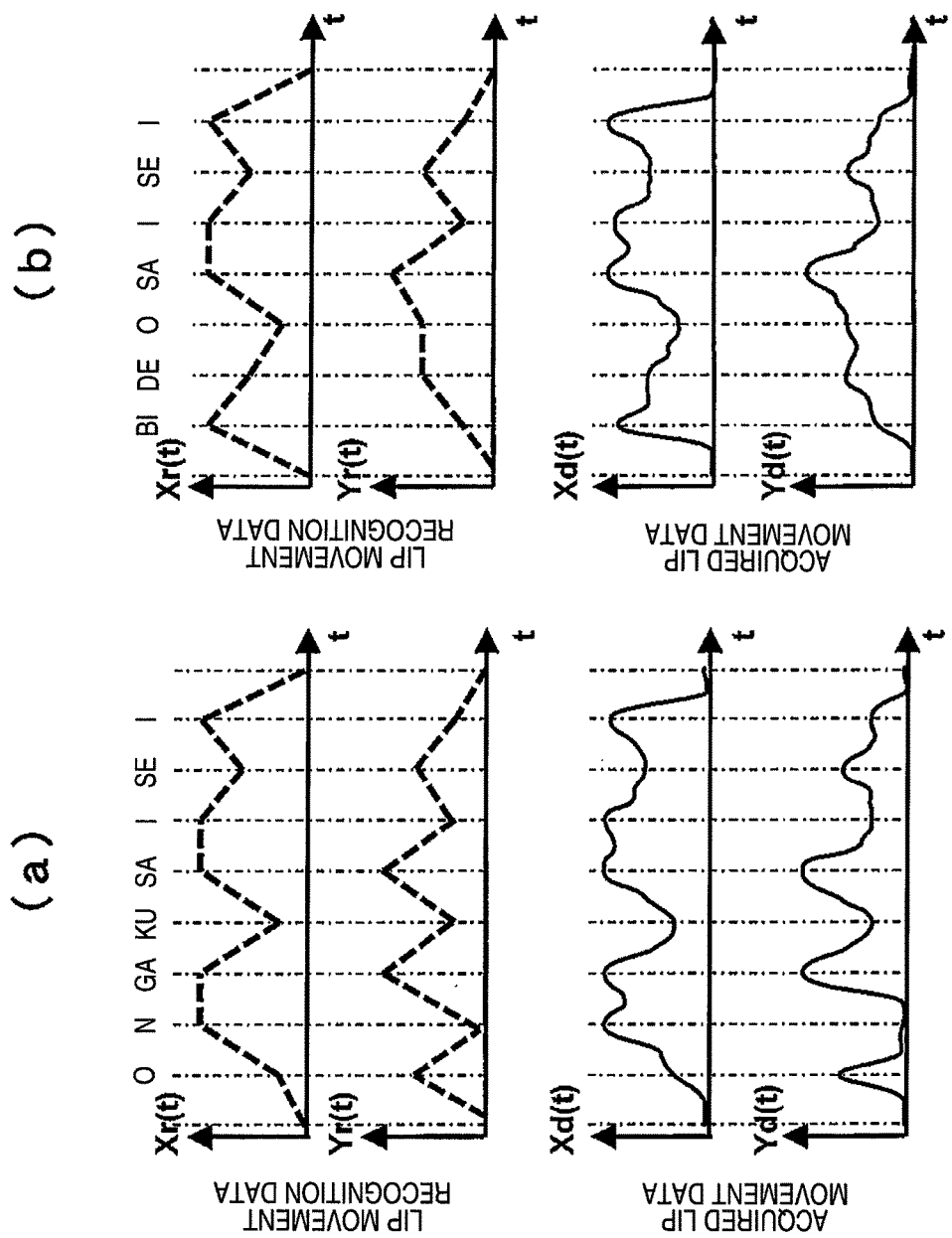
FIG. 10 is a drawing showing an example of lip movement recognition data and acquired lip movement data in the lip movement recognition operation determination process.

In FIG. 10, examples of the lip movement recognition data Xr(t), Yr(t) and the acquired lip movement data Xd(t), Yd(t) are shown. FIG. 10(a) corresponds to a selection option "o-n-ga-ku-sa-i-se-i (music reproduction)", and FIG. 10(b) corresponds to "bi-de-o-sa-i-se-i (video reproduction)". X shows the lateral size of the lips, and Y shows the vertical size of the lips. For example, the size of the lips for "ga" and "sa" corresponding to the vowel "a" is large in both X and Y. On the other hand, the lip size X of "i" and "bi" corresponding to the vowel "i" is comparatively large, whereas Y is small. Thus, from the lip movement data Xd(t), Yd(t) acquired as the lip movement and the lip movement recognition data Xr(t), Yr(t) corresponding to the operation options stored in the memory 104, an option whose temporal change of the lip size X, Y is closest can be determined as the recognition result.

An example of a lip movement recognition data renewal process S407 will be described using FIG. 11.

FIG. 11(a) shows lip movement recognition data before renewal Yr(t), FIG. 11(b) shows acquired lip movement data Yd(t), and FIG. 11(c) shows lip movement recognition data after renewal Yr(t)'. Here, the lip movement recognition data after renewal Yr(t)' is defined by an expression below.

$$Yr(t)'=Yr(t)+\alpha \cdot (Yd(t)-Yr(t)) \quad \text{(MATH. 1)}$$

The lip recognition data after renewal Yr(t)' is used as the lip movement recognition data Yr(t) in the next lip movement recognition.

Here, α is a coefficient that determines the speed at which the lip movement recognition data converges to the acquired lip movement data. When α=1 for example, $$Yr(t)'=Yd(t) \quad \text{(MATH. 2)}$$

is fulfilled, and the acquired lip movement data Yd(t) becomes the lip movement recognition data in the next lip movement recognition. When α=0.5, $$Yr(t)'=0.5 \cdot (Yd(t)+Yr(t)) \quad \text{(MATH. 3)}$$

is fulfilled, and the average of the acquired lip movement data Yd(t) and the lip movement recognition data before renewal Yr(t) becomes the lip movement recognition data in the next lip movement recognition. With respect to the range of α, α that fulfils $$0<\alpha<1 \quad \text{(MATH. 4)}$$

is selected. As α is larger, the lip movement recognition data converges to the acquired lip movement data more quickly. FIG. 11(c) shows a case of α=0.5.

The lip movement recognition data after renewal Xr(t)' is also given similarly by the formula below.

$$Xr(t)'=Xr(t)+\alpha \cdot (Xd(t)-Xr(t)) \quad \text{(MATH. 5)}$$

By the process described above, the lip movement recognition data after renewal Xr(t)', Yr(t)' are renewed to data closer to the actually acquired lip movement than those before renewal, and are used as the lip movement recognition data Xr(t), Yr(t) in the next lip movement recognition. By repeating it, the lip movement recognition data Xr(t), Yr(t) which match the lip movement of the operator more closely can be obtained, and the accuracy of the lip movement recognition can be improved.

By the voice recognition operation determination process or the lip movement recognition operation determination process described above, which operation is to be executed can be determined.

Next, the process for determining the object of operation (S203) will be described.

Figure 12:
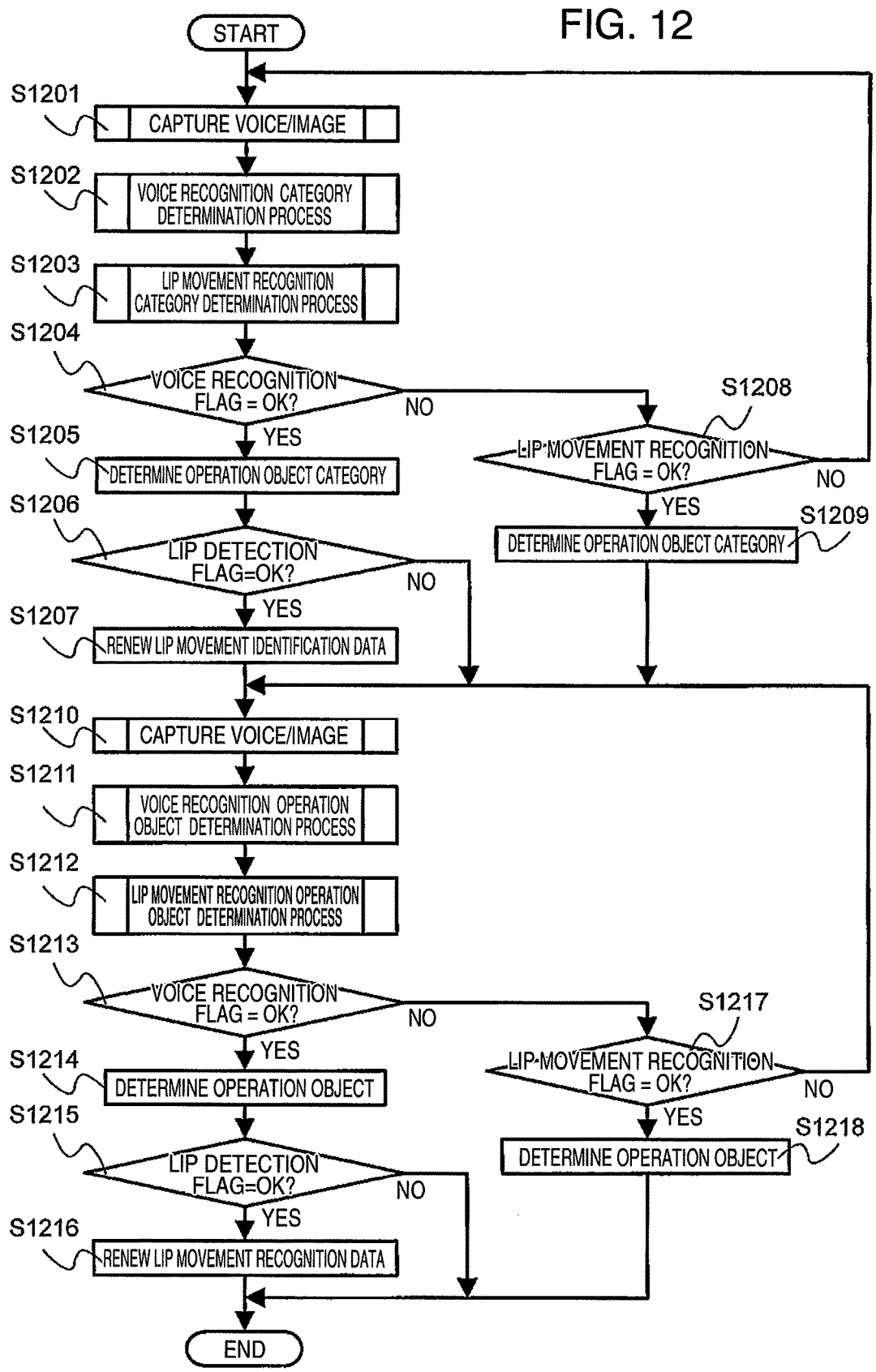
FIG. 12 is an example of a flowchart explaining an operation object determination process.

In FIG. 12, an example of a flowchart of the operation object determination process is shown.

In FIG. 12, first, a voice is captured from the microphone 112 through the audio processor 113, and the image including at least the lip portion of the operator is captured from the imaging unit 120 through the image processing unit 119 (S1201). Next, a voice recognition category determination process S1202 and a lip movement recognition category determination process S1203 are executed. In a branch process S1204, whether the voice recognition has been successful in the voice recognition category determination process S1202 is determined by the voice recognition flag. When the voice recognition has been successful (Yes), the category of the operation object is determined based on the result recognized in the voice recognition category determination process S1202 (S1205). Next, in a branch process S1206, whether the image has been captured without that the lip portion departs from the imaging range and acquisition of the lip movement data has been successful is determined by the lip detection flag. When acquisition of the lip movement data has been successful (Yes), the lip movement recognition data of the memory area 104b are renewed corresponding to the voice recognition result (S1207), and the process proceeds to the next process S1210. On the other hand, when it is determined that acquisition of the lip movement data has failed by the lip movement flag in the branch process S1206 (No), the lip movement recognition data of the memory area 104b is not renewed, and the process proceeds to the next process S1210.

When it is determined that the voice recognition has failed (No) by the voice recognition flag in the branch process S1204 (No), whether recognition has been successful in the lip movement recognition category determination process S1203 is determined by the lip movement recognition flag in a branch process 1208. When the lip movement recognition has been successful (Yes), the category of the operation object is determined based on the result recognized in the lip movement recognition category determination process S403 (S1209), and the process proceeds to the next process S1210. On the other hand, when it is determined that the lip movement recognition has failed by the lip movement recognition flag in the branch process S1208 (No), the process returns again to the process for acquiring the voice and image (S1201).

In S1210, a voice and an image including at least the lip portion of the operator are acquired again. A voice recognition operation object determination process S1211 and a lip movement recognition operation object determination process S1212 are executed based on the voice and image acquired. In a branch process S1213, whether recognition has been successful in the voice recognition operation object determination process S1211 is determined by the voice recognition flag. When the voice recognition has been successful (Yes), the operation object is determined based on the result recognized in the voice recognition operation object determination process S1211 (S1214). Next, in a branch process S1215, whether the image has been acquired without that the lip portion departs from the imaging range and acquisition of the lip movement data has been successful is determined by the lip detection flag. When acquisition of the lip movement data has been successful (Yes), the lip movement recognition data of the memory area 104b is renewed corresponding to the voice recognition result (S1216), and the process is finished. On the other hand, when it is determined that acquisition of the lip movement data has failed by the lip detection flag in the branch process S1215 (No), the lip movement recognition data of the memory area 104b is not renewed, and the process is finished.

When it is determined that the voice recognition has failed by the voice recognition flag in the branch process S1213 (No), whether the lip movement recognition has been successful in the lip movement recognition operation object determination process S1212 is determined by the lip movement recognition flag in a branch process 1217. When the lip movement recognition has been successful (Yes), the operation object is determined based on the result recognized in the lip movement recognition operation object determination process S1212 (S1218), and the process is finished. On the other hand, when it is determined that the lip movement recognition has failed by the lip movement recognition flag in the branch process S1217 (No), the process returns to the process for capturing the voice and image again (S1210).

Figure 13:
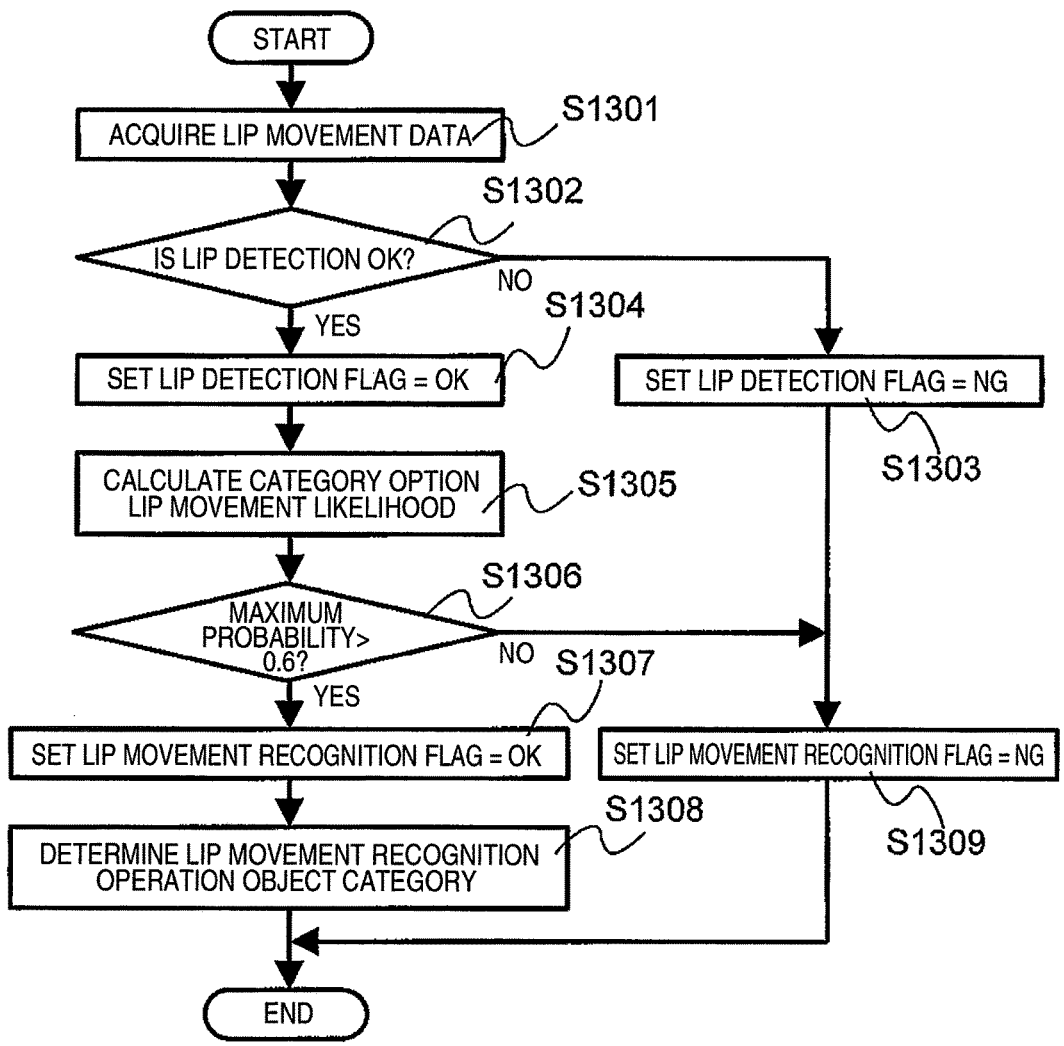
FIG. 13 is an example of a flowchart explaining a lip movement recognition category determination process.

FIG. 13 is a flowchart showing an example of a lip movement recognition category determination process.

In the flowchart of FIG. 13, first, the lip movement is detected from the image of the lip movement inputted, and the lip movement data is acquired (S1301). When the lip portion has departed from the imaging range, the lip cannot be detected, and acquisition of the lip movement data has failed in the lip movement data acquisition process S1301, it is determined to be No in the branch process 1302, the lip detection flag and the lip movement recognition flag are set to NG (S1303, S1309), and the process is finished. On the other hand, when acquisition of the lip movement data from the image of the lips inputted in the lip movement data acquisition process S1301 has been successful, it is determined to be Yes in the branch process 1302, and the lip detection flag is set to OK (S1304). Next, the likelihood of this lip movement data acquired and the lip movement recognition data corresponding to the operation options stored in the memory area 104b is calculated (S1305).

In FIG. 14, an example of a table of category options corresponding to operations is shown. The attribute of the metadata imparted to the data such as music and photo is equivalent to the category. For example, to respective music data, data on the attribute (category) such as the name of the music piece, artist, and album are imparted as the metadata.

In a branch process S1306, when the maximum probability (maximum likelihood) of the result of the likelihood calculation is equal to or greater than a predetermined value (here, the value is set to 0.6 as an example) (Yes), the lip movement recognition flag is set to OK (S1307), an operation category that gives the maximum probability is determined as the recognition result (S1308), and the process is finished. On the other hand, when it is determined to be No in the branch process S1306, the lip movement recognition flag is set to NG (S1309), and the process is finished.

Next, the voice recognition category determination process S1202 will be described.

Figure 15:
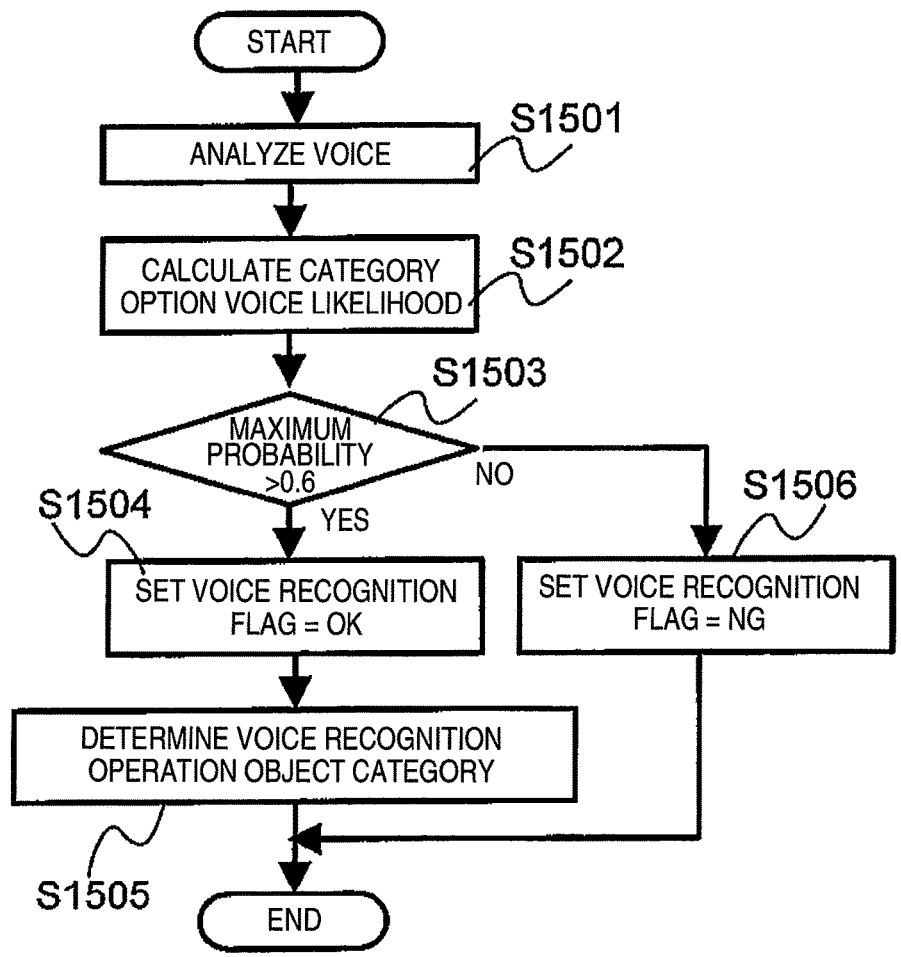
FIG. 15 is an example of a flowchart explaining a voice recognition category determination process.

FIG. 15 is a flowchart showing an example of the voice recognition category determination process.

In FIG. 15, first, the voice inputted from the microphone 112 through the audio processor 113 is analyzed, and the time series pattern of the characteristic parameter of the input voice is extracted (S1501). Next, likelihood for the voice recognition data corresponding to the category options stored in the memory area 104a as an acoustic model by HMM (S1502) is calculated. In a branch process S1503, when the maximum probability (maximum likelihood) of the result of the likelihood calculation is equal to or greater than a predetermined value (here, the value is set to 0.6 as an example) (Yes), the recognition flag is set to OK (S1504), a category option that gives the maximum probability is determined as the recognition result (S1505), and the process is finished. On the other hand, when it is determined to be No in the branch process S1503, it is determined that the voice recognition has failed due to the noise and the like, the recognition flag is set to NG (S1506), and the process is finished.

By the lip movement recognition category determination process or the voice recognition category determination process described above, to which category an operation object belongs can be determined.

Next, a lip movement recognition operation object determination process and a voice recognition operation object determination process for determining an operation object that belongs to a determined category will be described.

Figure 16:
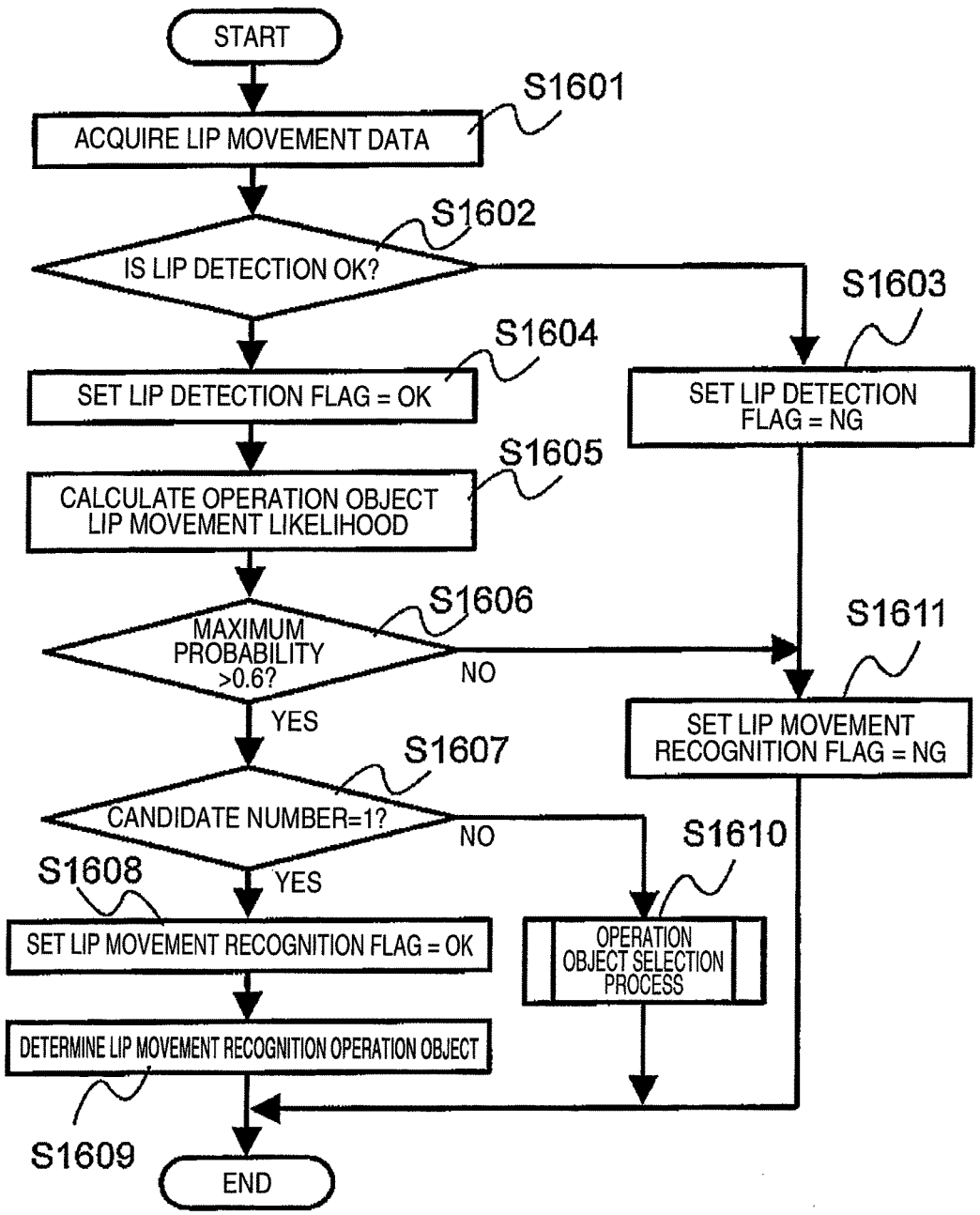
FIG. 16 is an example of a flowchart explaining a lip movement recognition operation object determination process.

FIG. 16 is a flowchart showing an example of the lip movement recognition operation object determination process.

In the flowchart of FIG. 16, first, movement of the lips is detected from the image of the lip movement inputted, and the lip movement data is acquired (S1601). When the lip portion departs from the imaging range, the lip cannot be detected, and acquisition of the lip movement data has failed in the lip movement data acquisition process S1601, it is determined to be No in a branch process 1602, the lip detection flag and the lip movement recognition flag are set to NG (S1603, S1611), and the process is finished. On the other hand, when the lip movement data has been successfully acquired from the image of the lip portion inputted in the lip movement data acquisition process S1601, it is determined to be Yes in the branch process S1602, and the lip detection flag is set to OK (S1604). To the data such as music and photo stored in the storage 105, the metadata on the attribute such as the title, artist, and filming date have been imparted. In S1605, the likelihood of the lip movement recognition data corresponding to the description of the attribute portion of a selected category (lip movement recognition data corresponding to the title of a music piece recorded as the metadata of each music data when the name of a music piece for example is selected as the category) and the lip movement data acquired is calculated. In a branch process S1606, when the maximum probability (maximum likelihood) of the result of the likelihood calculation is equal to or greater than a predetermined value (here, the value is set to 0.6 as an example) (Yes), whether there are plural candidate numbers, namely whether there are plural data in which the maximum probability becomes a predetermined value or more, is determined, and a branch process is executed (S1607). When the candidate number is one (Yes), the lip movement recognition flag is set to OK (S1608), an operation object that gives the maximum probability is determined as the recognition result (S1609), and the process is finished. On the other hand, when it is determined to be a case of plural candidate numbers in the branch process S1607 (No), an operation object selection process (S1610) is executed, and the process is finished. On the other hand, when it is determined to be No in the branch process S1606, the lip movement recognition flag is set to NG (S1611), and the process is finished.

The operation object selection process S1610 will be described using a flowchart of FIG. 17.

Figure 17:
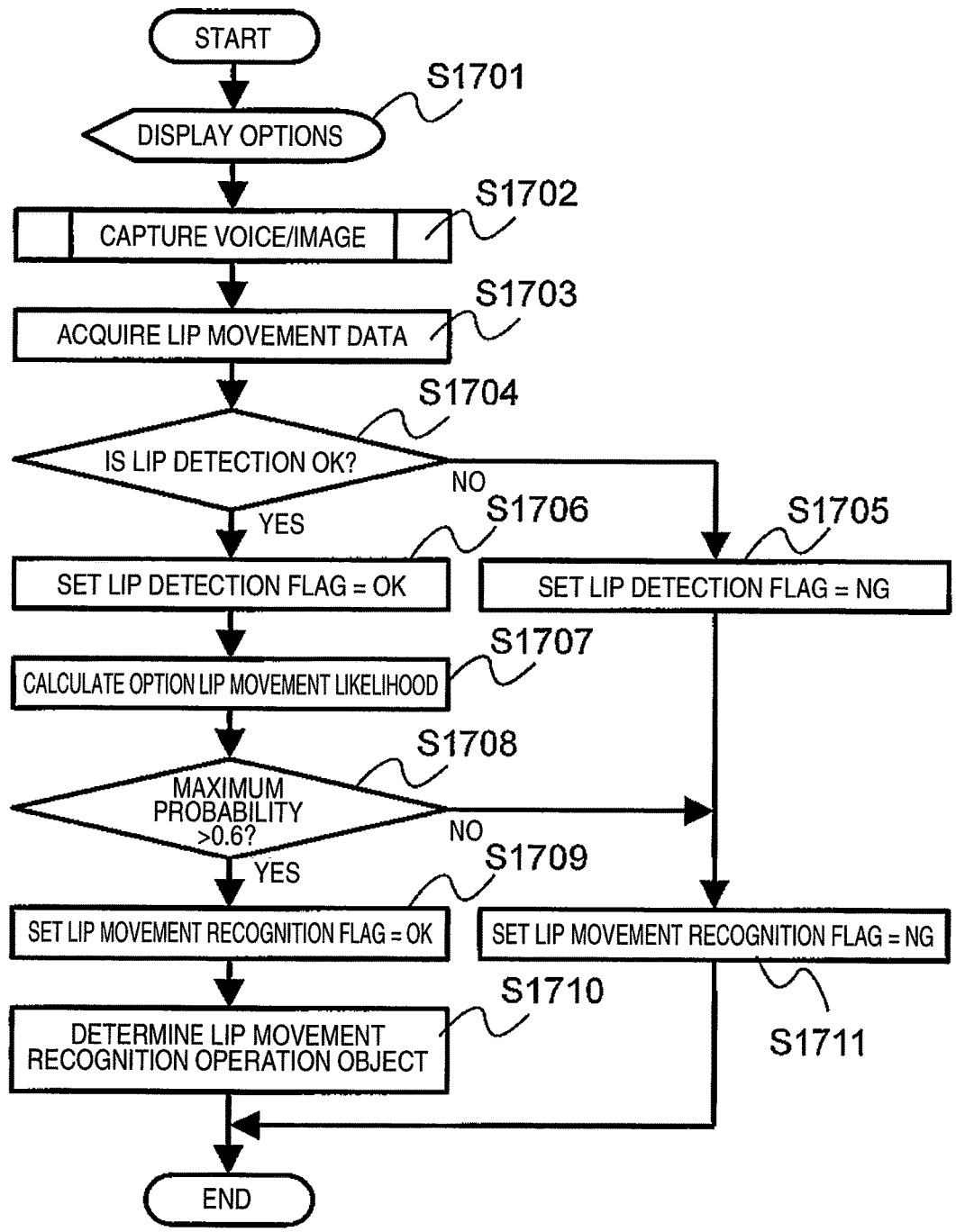
FIG. 17 is an example of a flowchart explaining an operation object selection process by lip movement recognition.
Figure 18:
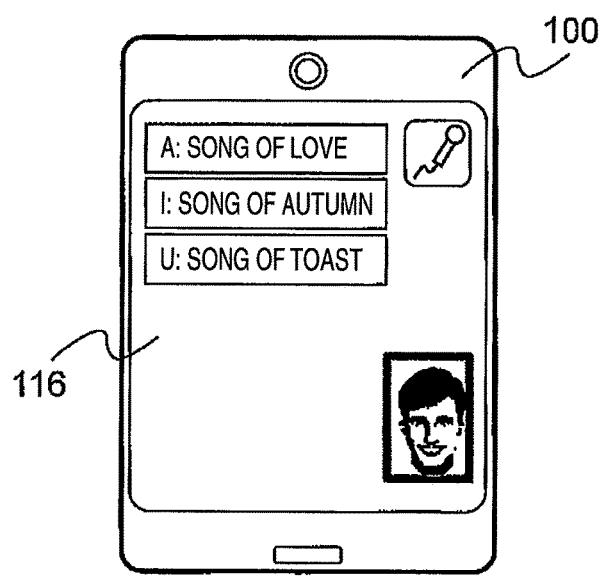
FIG. 18 is a drawing showing a display example of a portable terminal in an operation object selection process.
Figure 19:
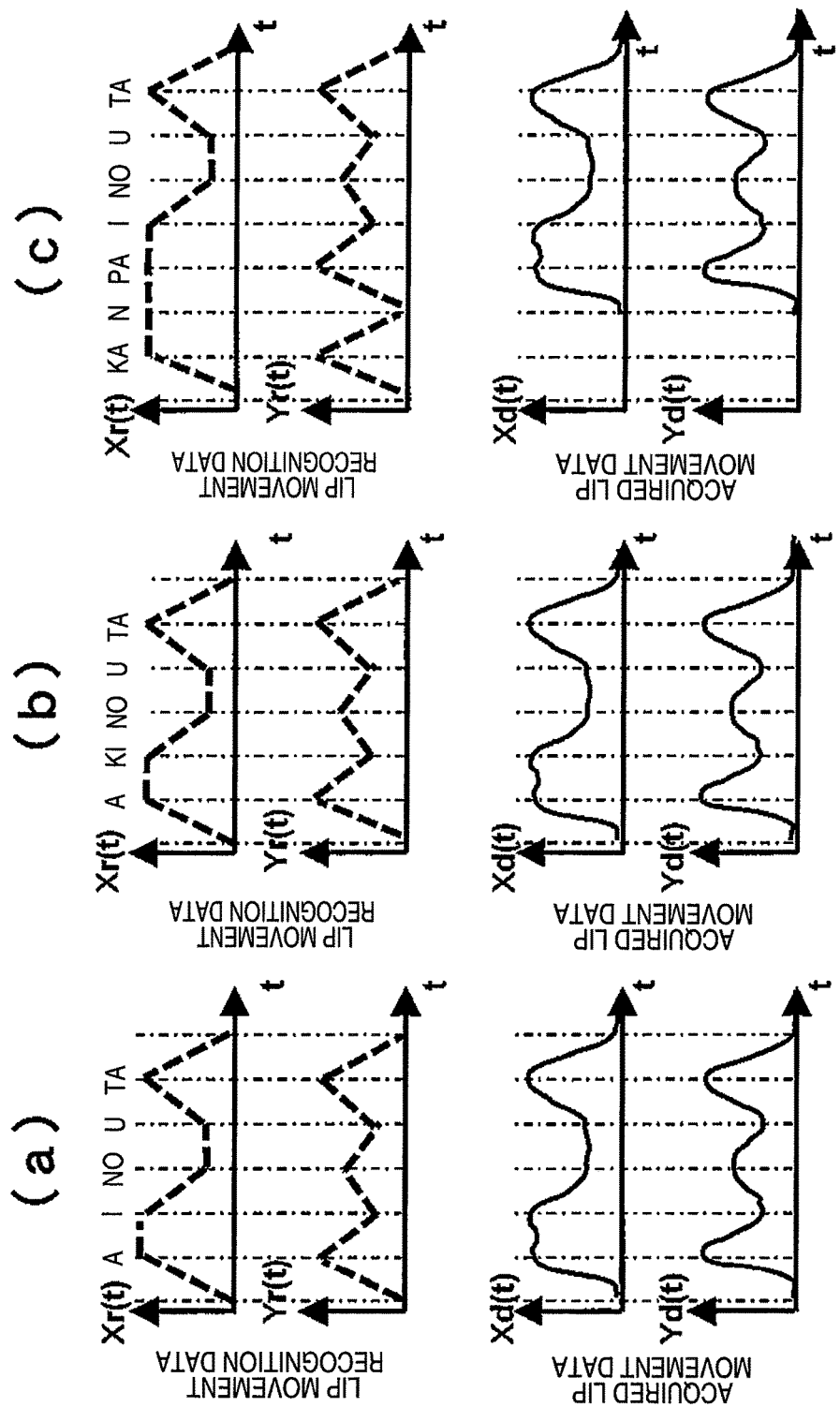
FIG. 19 is a drawing showing an example of lip movement recognition data and lip movement acquisition data in the lip movement recognition operation object determination process.

In FIG. 17, first, plural candidates are displayed on the display 118 of the touch pad 116 (S1701). An example of the display is shown in FIG. 18. Here, the example is a case there are three music pieces that become the candidate. Also, the lip movement recognition data and the acquired lip movement data corresponding to them are shown in FIG. 19. In this case, a portion where the lip movement recognition data Xr(t), Yr(t) are almost same to each other is included, and the operation object cannot be determined only by the lip movement. Therefore, characters with different lip shape for selection are added to the name of the music piece and are displayed ("a", "i", and "u" here). Next, the image including at least the lip portion of the operator is captured from the imaging unit 120 through the image processing unit 119 (S1702). First, the lip movement is detected from the image of the lip movement inputted, and the lip movement data is acquired (S1703). When the lip portion departs from the imaging range, the lip cannot be detected and acquisition of the lip movement data has failed in the lip movement data acquisition process S1703, it is determined to be No in a branch process 1704, the lip detection flag and the lip movement recognition flag are set to NG (S1705, S1711), and the process is finished. On the other hand, when the lip movement data has been successfully acquired from the image inputted in the lip movement data acquisition process S1703, it is determined to be Yes in the branch process S1704, and the lip detection flag is set to OK (S1706). Next, the likelihood of the lip movement data corresponding to this inputted image and the lip movement recognition data corresponding to the characters added for selection ("a", "i", and "u" in the example of FIG. 18) is calculated (S1707). In a branch process S1708, when the maximum probability (maximum likelihood) of the result of the likelihood calculation is equal to or greater than a predetermined value (here, the value is set to 0.6 as an example) (Yes), the lip movement recognition flag is set to OK (S1709), an option that gives the maximum probability is determined as the operation object (S1710), and the process is finished. On the other hand, when it is determined to be No in the branch process S1708, the lip movement recognition flag is set to NG (S1711), and the process is finished.

As described above, even when there are plural candidates whose lip movement is generally same each other, by adding characters or a character string of different lip shape, the operation object can be determined.

Figure 20:
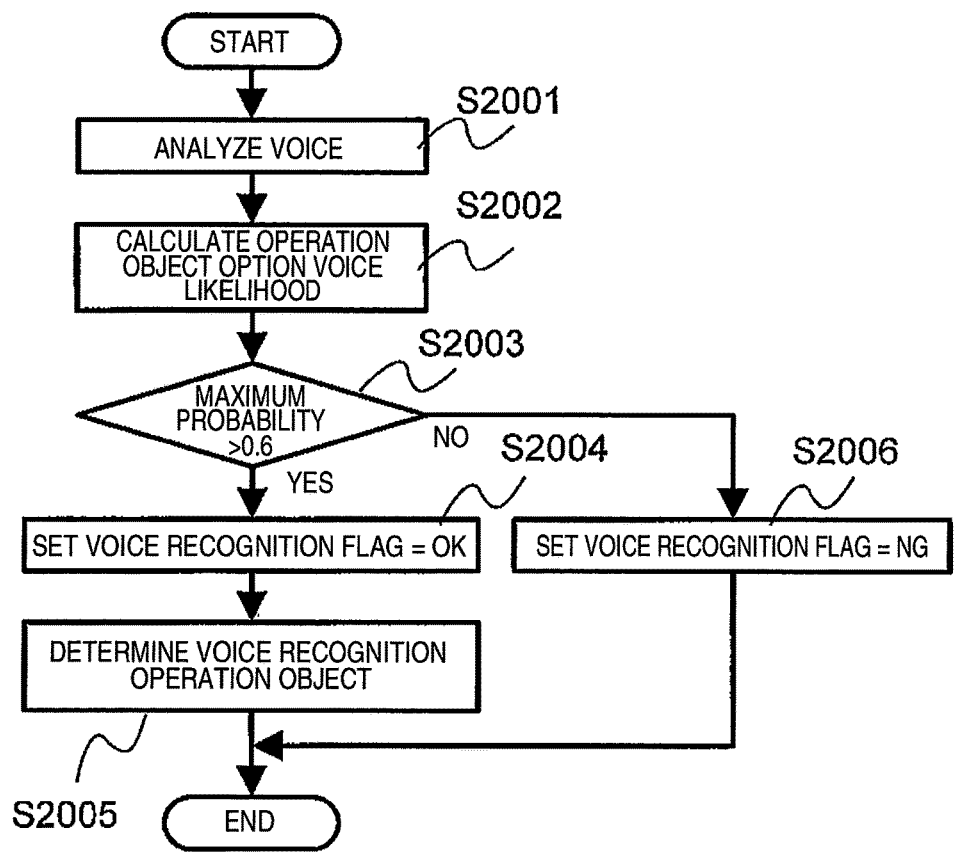
FIG. 20 is an example of a flowchart explaining a voice recognition operation object determination process.

FIG. 20 is a flowchart showing an example of a voice recognition operation object determination process S1211.

In FIG. 20, first, the voice inputted from the microphone 112 through the audio processor 113 is analyzed, and the time series pattern of the characteristic parameter of the input voice is extracted (S2001). With respect to the description of the attribute portion of the data such as music and photo (when the name of the music piece is selected for example as the category, the title of the music piece stored as the metadata of respective music data), the likelihood for the voice recognition data stored as the acoustic model in the memory area 104a is calculated (S2002). In a branch process S2003, when the maximum probability (maximum likelihood) of the result of the likelihood calculation is equal to or greater than a predetermined value (here, the value is set to 0.6 as an example) (Yes), the voice recognition flag is set to OK (S2004), an operation option that gives the maximum probability is determined as the recognition result (S2005), and the process is finished. On the other hand, when it is determined to be No in the branch process S2003, the voice recognition flag is set to NG, and the process is finished.

Figure 21:
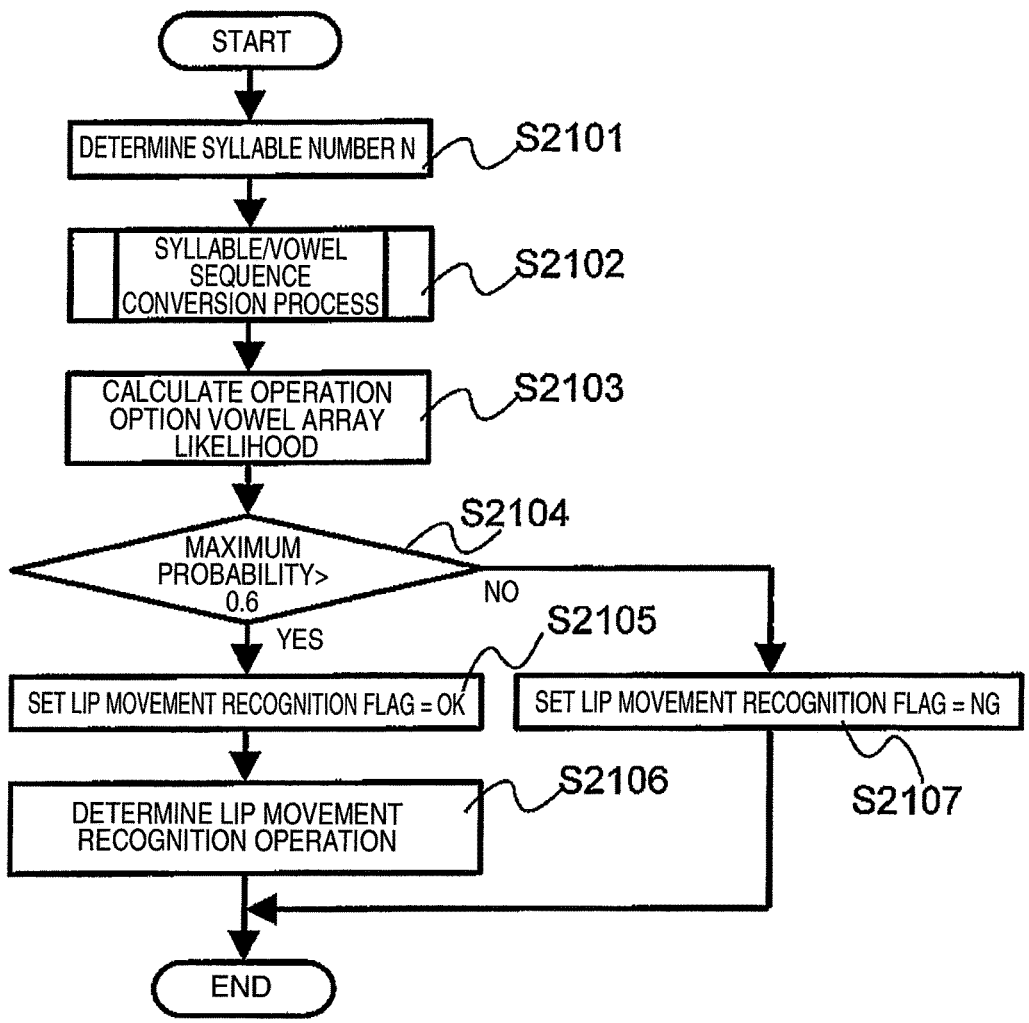
FIG. 21 is the second example of a flowchart explaining a lip movement recognition operation determination process.

Another embodiment of the lip movement recognition operation determination process S405 is shown in FIG. 21. In the present embodiment, the lip shape is made to correspond to the vowel, and the lip movement is recognized as a sequence of the vowels.

In FIG. 21, first, the syllable number N is determined from the image of the lip movement inputted (S2101). Next, to which vowel the lip shape corresponding to each syllable corresponds is determined by a syllable and vowel sequence conversion process, and the lip movement is converted to a vowel sequence corresponding to syllables of N pieces (S2102). The likelihood of this vowel sequence corresponding to the inputted image and the lip movement recognition data expressed by the vowel sequence corresponding to the operation option stored in the memory 104b is calculated (S2103).

In a branch process S2104, when the maximum probability (maximum likelihood) of the result of the likelihood calculation is equal to or greater than a predetermined value (here, the value is set to 0.6 as an example) (Yes), the recognition flag is set to OK (S2105), an operation option that gives the maximum probability is determined as the recognition result (S2106), and the process is finished. On the other hand, when it is determined to be No in the branch process S2104, the recognition flag is set to NG (S2107), and the process is finished.

An example of the table of the vowel sequence corresponding to the operation options stored beforehand in the memory 104b is shown in FIG. 22. For example, the vowel sequence corresponding to "ongakusaisei (music reproduction)" becomes "o-a-u-a-i-e-i". The likelihood of this vowel sequence corresponding to the operation option and the vowel sequence corresponding to the inputted image is calculated, and an operation option with the largest likelihood is determined as the recognition result. By differentiating the vowel sequence of the row of the characters of each operation option, the operation option and the vowel sequence can make one-to-one correspondence, and the operation option can be determined by the vowel sequence. When recognition is made by the vowel sequence, the vowel sequence for the operation option is stored, therefore the temporal change of the lip size X and Y is not required to be stored as the lip movement recognition data for the operation option shown in FIG. 10, and the use amount of the memory 104b can be reduced.

Figure 23:
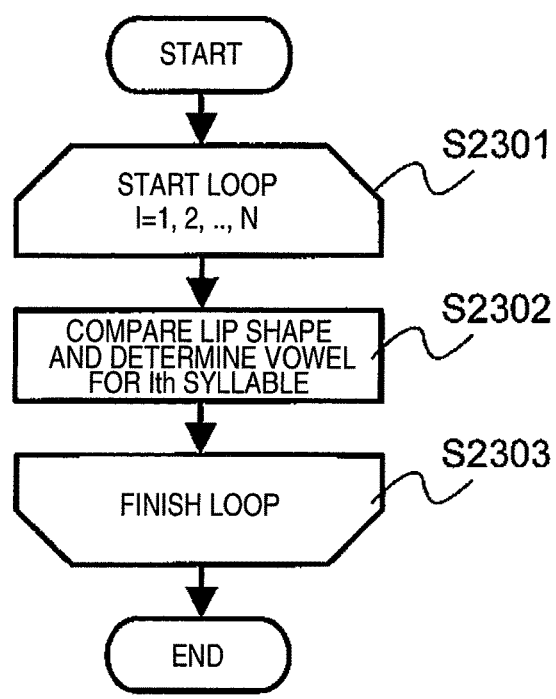
FIG. 23 is an example of a flowchart explaining a syllable and vowel sequence conversion process.

In FIG. 23, an example of a flowchart of a syllable and vowel sequence conversion process (S2102) is shown.

In FIG. 23, first, a loop process is started with a parameter I that designates the syllable to be compared with the vowel lip shape being made from 1 to the syllable number N (S2301), and a process of S2302 is repeated to a loop finishing process of S2303. In S2302, the lip shape corresponding to the Ith syllable of the inputted image and the lip shape corresponding to the vowel in the vowel recognition data stored in the memory 104b are compared to each other, and the vowel corresponding to the Ith syllable is determined. By the processes described above, the syllables of N pieces corresponding to the inputted image are converted to a vowel sequence.

Figure 24:
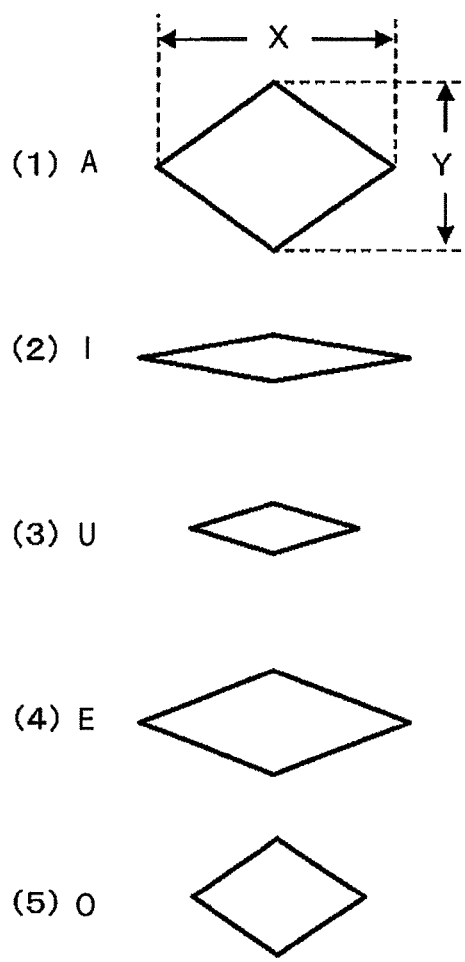
FIG. 24 is a drawing showing an example of the lip shapes that correspond to the vowels.

In FIG. 24, an example of the lip shapes corresponding to the vowels is shown. Here, the lip shapes that correspond to the vowels of "a", "i", "u", "e", and "o" of the Japanese language are shown. For example, as shown in the table of FIG. 25, the size of the vertical width X and the lateral width Y of the lips is expressed in three steps, and are related to each vowel. Thereby, the vertical width X and the lateral width Y of the lip shape of the inputted image can be obtained, and the corresponding vowel can be determined according to the table of FIG. 25.

The recognition method by the vowel sequence described above may be applied not only to the lip movement recognition operation determination process S405 but also to the lip movement recognition category determination process S1104 and the lip movement recognition operation determination process S1109.

Figure 26:
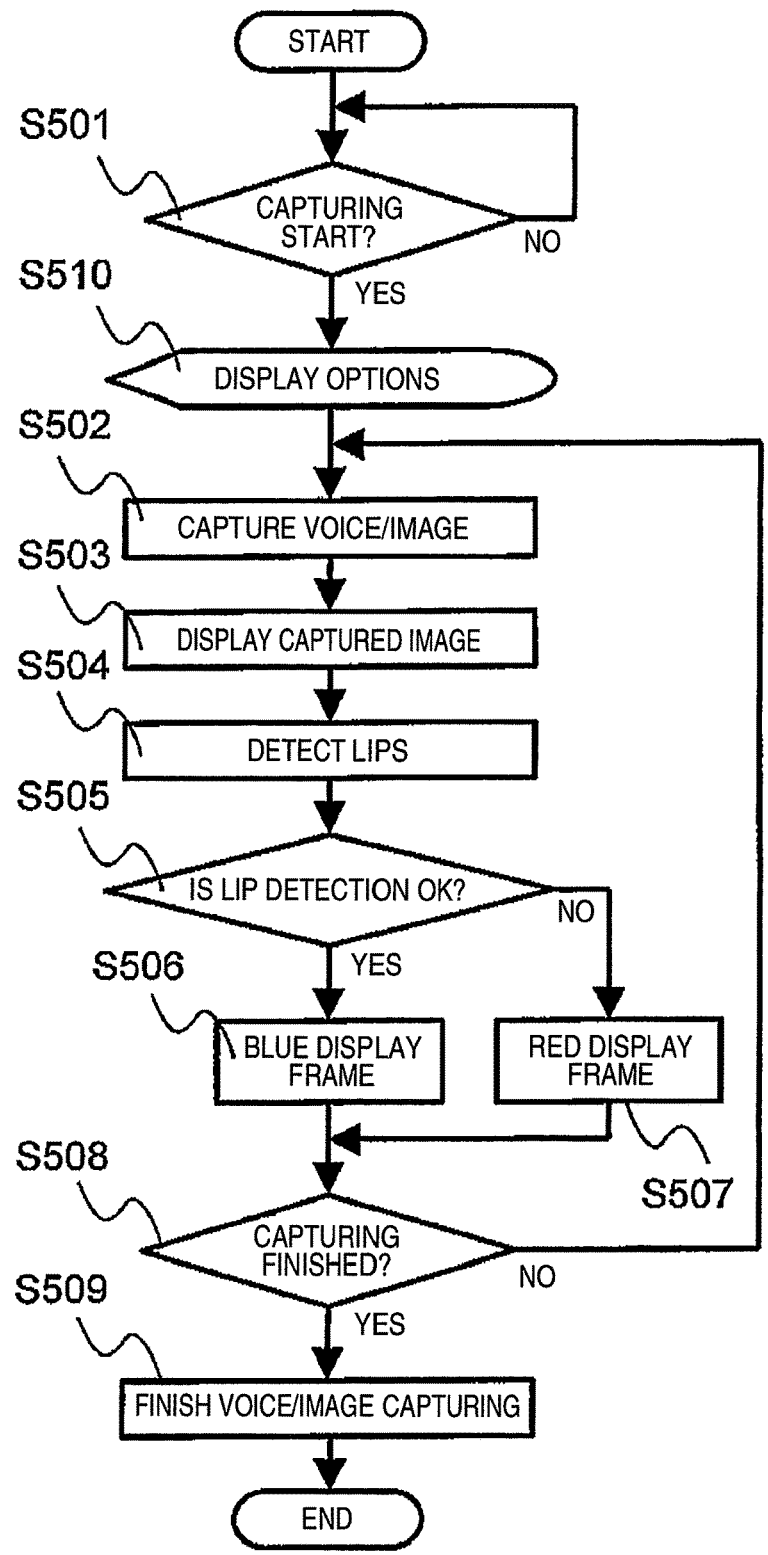
FIG. 26 is the second example of a flowchart explaining a process for capturing the voice and image.

FIG. 26 is a flowchart showing another embodiment of the process for capturing a voice and an image including the lip portion.

Figure 27:
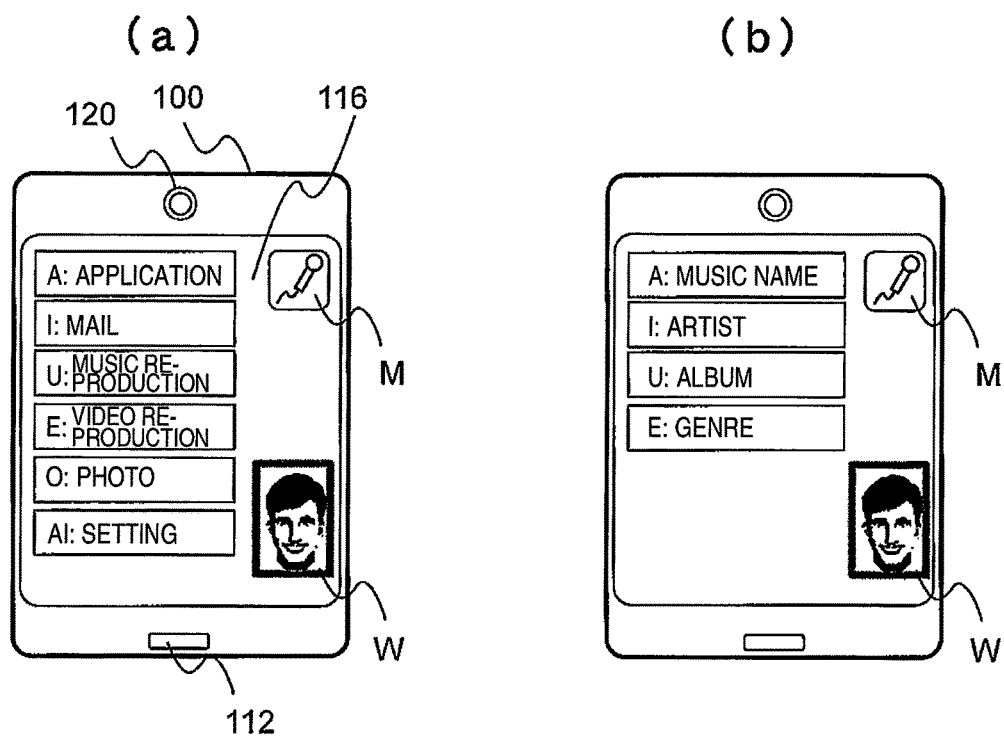
FIG. 27 is a drawing showing a display example in the process for capturing the voice and image.

In FIG. 26, the point different from the voice/image capturing process of FIG. 5 is that an option display process S510 is added. In FIG. 27, an example of the display in the process for capturing the voice and the image including the lip portion is shown. FIG. 27(a) is the display of an operation option in a state of home in the operation determination process, and FIG. 27(b) is the display of a category option in reproducing music in the operation object determination process. Characters with different vowel or a character string for selection are added and displayed, and an operation selection process is executed by voice recognition or lip movement recognition with respect to the characters or character string portion added. Thereby, because recognition can be executed by short character or character string with different vowel, recognition can be executed easily and surely.

As described above, by displaying the option on the display 118, the operation option or the category option is not required to be remembered each time, and can be surely selected. However, it may be configured that whether the option is to be displayed or not can be set so that the options are not displayed when the operator is accustomed to operation of the portable terminal and so on.

Embodiment 2

Figure 28:
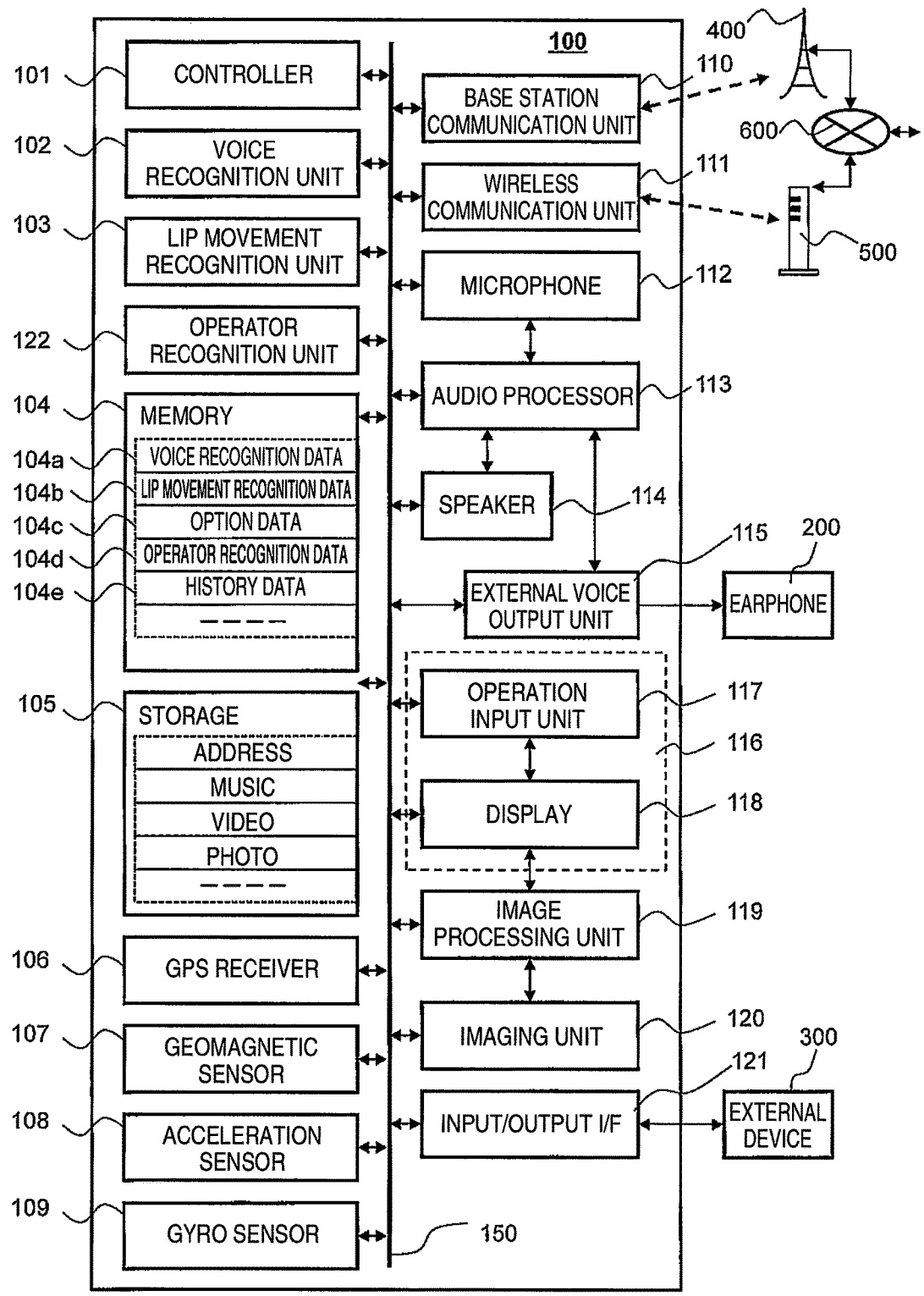
FIG. 28 is a block diagram showing a configuration example of a portable terminal device according to the second embodiment of the present invention.

FIG. 28 is a block diagram showing a configuration example of the second embodiment of the portable terminal device 100, a same reference sign will be given to a portion having a function same to that of the configuration example of FIG. 1, and description thereof will be omitted.

In comparison with the configuration example of FIG. 1, the present embodiment is provided with an operator recognition unit 122 and operator recognition data with the latter being provided in a predetermined area 104d of the memory 104, and is coped with a case there are plural operators who use the portable terminal device 100.

Figure 29:
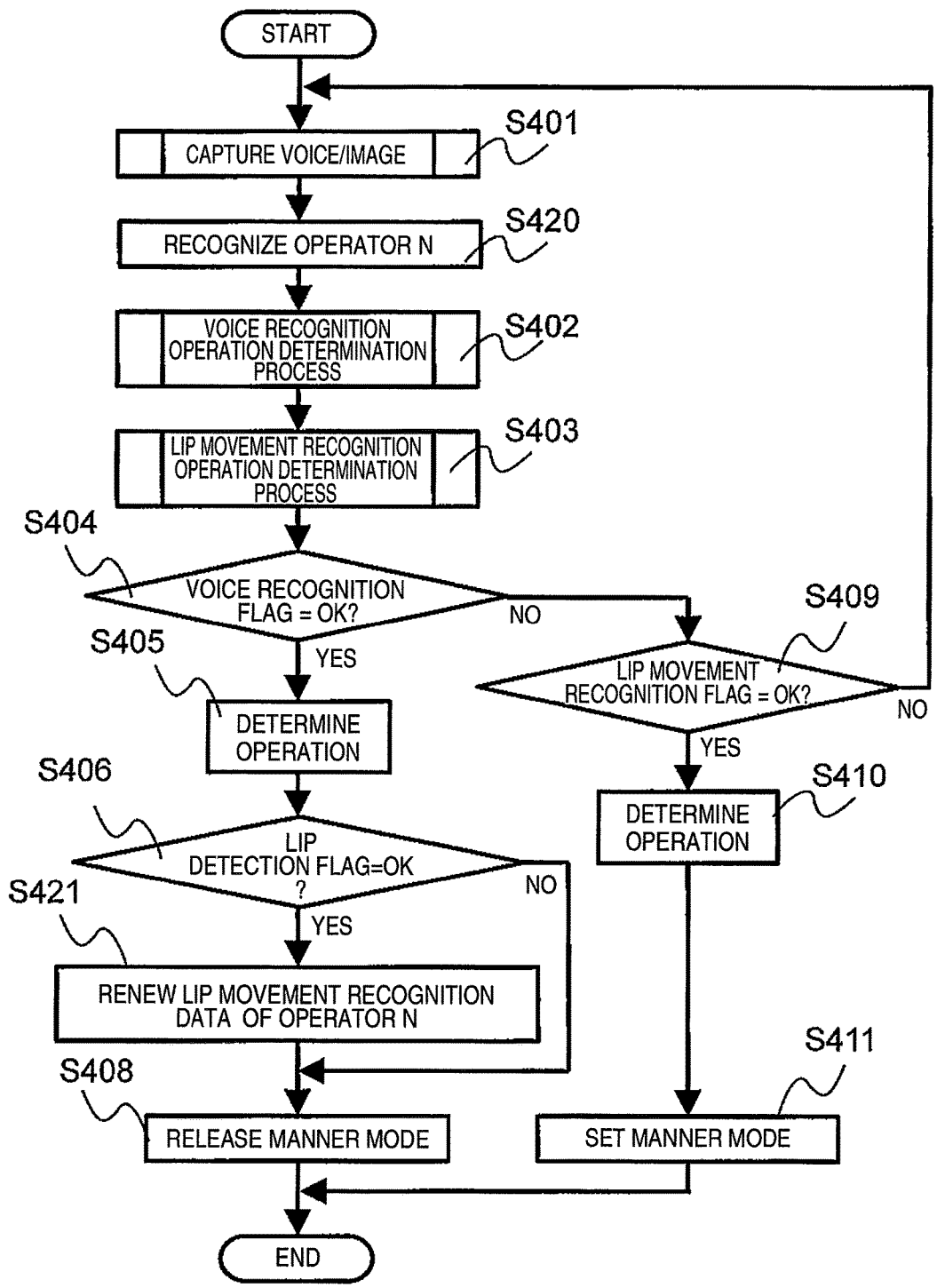
FIG. 29 is an example of a flowchart explaining an operation determination process according to Embodiment 2 of the present invention.

FIG. 29 is a flowchart showing an example of an operation determination process S201 according to Embodiment 2, and a same reference sign is given to a process same to that in the flowchart of FIG. 4.

In FIG. 29, first, a voice is captured from the microphone 112 through the audio processor 113, and an image including at least the lip portion of the operator is captured from the imaging unit 120 through the image processing unit 119 (S401). Next, an operator N who operates is recognized by the operator recognition unit 122 based on the voice and/or image captured in the voice/image capturing process S401 and the operator recognition data stored in the memory area 104d (S420). As the operator recognition data, for example, voice recognition data or face recognition data registered beforehand for logging in to the portable terminal device 100 can be used. After recognizing the operator, a voice recognition operation determination process S402 is executed by the voice recognition unit 102, and a lip movement recognition operation determination process S403 is executed by the lip movement recognition unit 103. In a branch process S404, whether the voice recognition has been successful in the voice recognition operation determination process S402 is determined by the voice recognition flag. When the voice recognition has been successful (Yes), which operation is to be executed is determined (S405) based on the result recognized in the voice recognition operation determination process S402. Next, in a branch process 406, the image is captured without that the lip portion departs from the imaging range, and whether lip movement data has been successfully acquired is determined by the lip detection flag. When the lip movement data has been successfully acquired (Yes), the lip movement recognition data corresponding to the operator N of the memory area 104b is renewed corresponding to the voice recognition result (S421), the manner mode is released (S408), and the process is finished. In operations after the manner mode release, operation guide by voice from the speaker 114 (or from the earphone 200 through the external voice output unit 115 when the earphone 200 has been connected), incoming call guiding by sound and the like are executed. On the other hand, when it is determined that acquisition of the lip movement data has failed by the lip detection flag in the branch process S406 (No), the lip movement recognition data of the memory area 104b is not renewed, the manner mode is released (S408), and the process is finished.

When it is determined by the voice recognition flag that the voice recognition has failed in the branch process S404 (No), whether the recognition has been successful in the lip movement recognition operation determination process S403 is determined by the lip movement recognition flag in a branch process 409. When the lip movement recognition has been successful (Yes), which operation is to be executed is determined based on the result recognized in the lip movement recognition operation determination process S403 (S410), the manner mode is set (S411), and the process is finished. In the manner mode, the output from the speaker 114 is put off, and operation guide or incoming call guiding or the like by the screen display without the sound is executed. On the other hand, when it is determined that the lip movement recognition has failed by the lip movement recognition flag in the branch process S409 (No), the process returns again to the process for acquiring the voice and image (S401).

By the processes described above, the lip movement recognition data corresponding to the operator is renewed for each operator, and the lip movement recognition data dealing with the individual difference of the lip movement can be obtained. Therefore, because the lip movement recognition is executed using the lip movement recognition data renewed corresponding to the operator in the lip movement recognition operation determination process S403, even when plural persons use a portable terminal device, the accuracy of lip movement recognition can be improved.

Further, the lip movement recognition data renewal process corresponding to the operator may be applied not only to the operation determination process S201 but also to the operation object determination process S203 in a similar manner.

Embodiment 3

Figure 30:
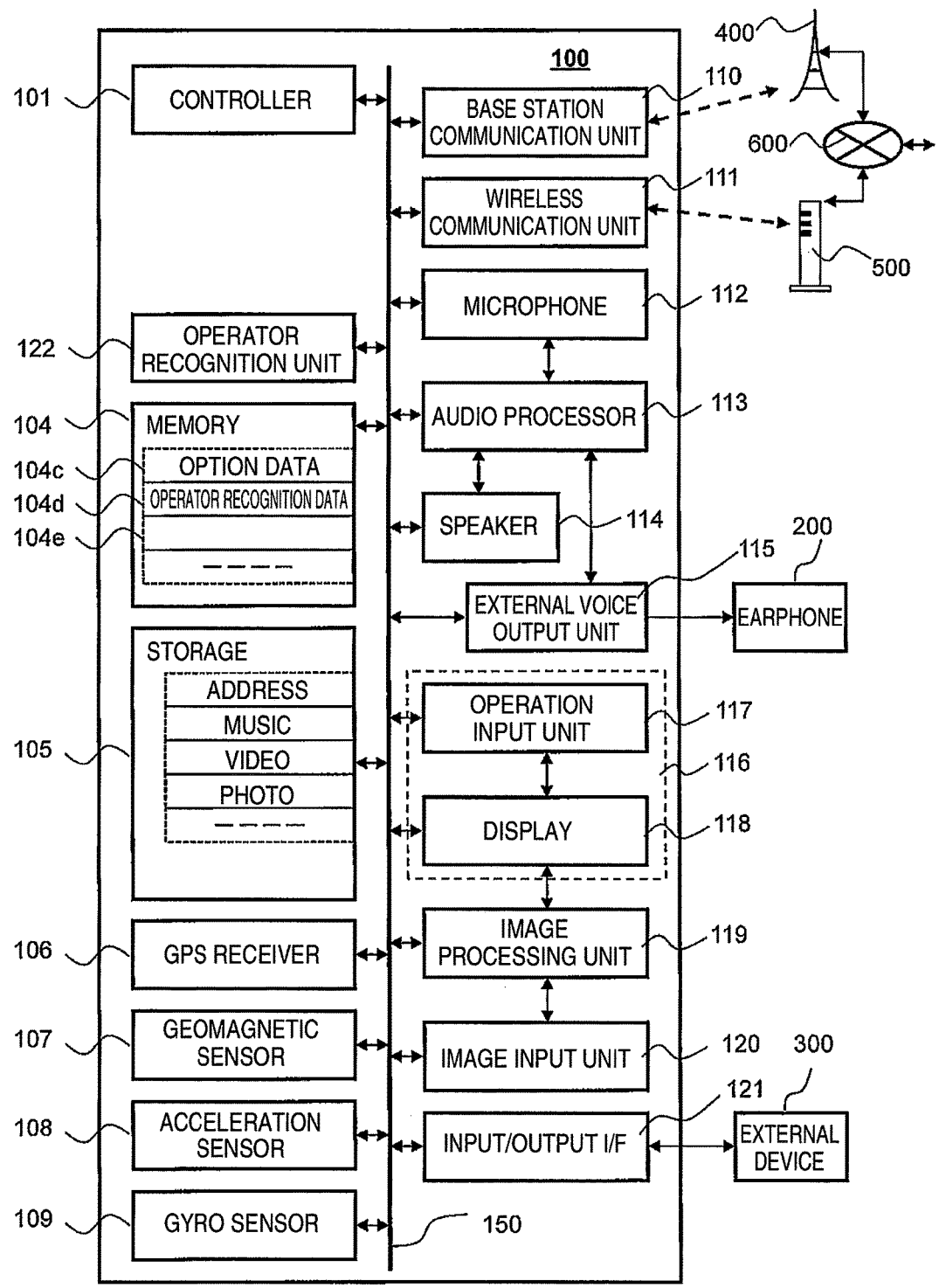
FIG. 30 is a block diagram showing a configuration example of a portable terminal device according to the third embodiment of the present invention.

FIG. 30 is a block diagram showing a configuration example of the third embodiment of the portable terminal device 100, a same reference sign will be given to a portion having a function same to that of the configuration example of FIG. 28, and description thereof will be omitted. Also, FIG. 31 is a block diagram showing a schematic configuration of a voice/lip movement recognition information processing system including the portable terminal device 100 of the present embodiment and a voice/lip movement recognition server 700.

In comparison with the configuration example of FIG. 28, in the portable terminal device 100 of the present embodiment, the voice recognition unit 102, the lip movement recognition unit 103, and the voice recognition data area and the lip movement recognition data area of the memory 104 are not arranged, and portions corresponding to them are arranged in the voice/lip movement recognition server 700.

Figure 31:
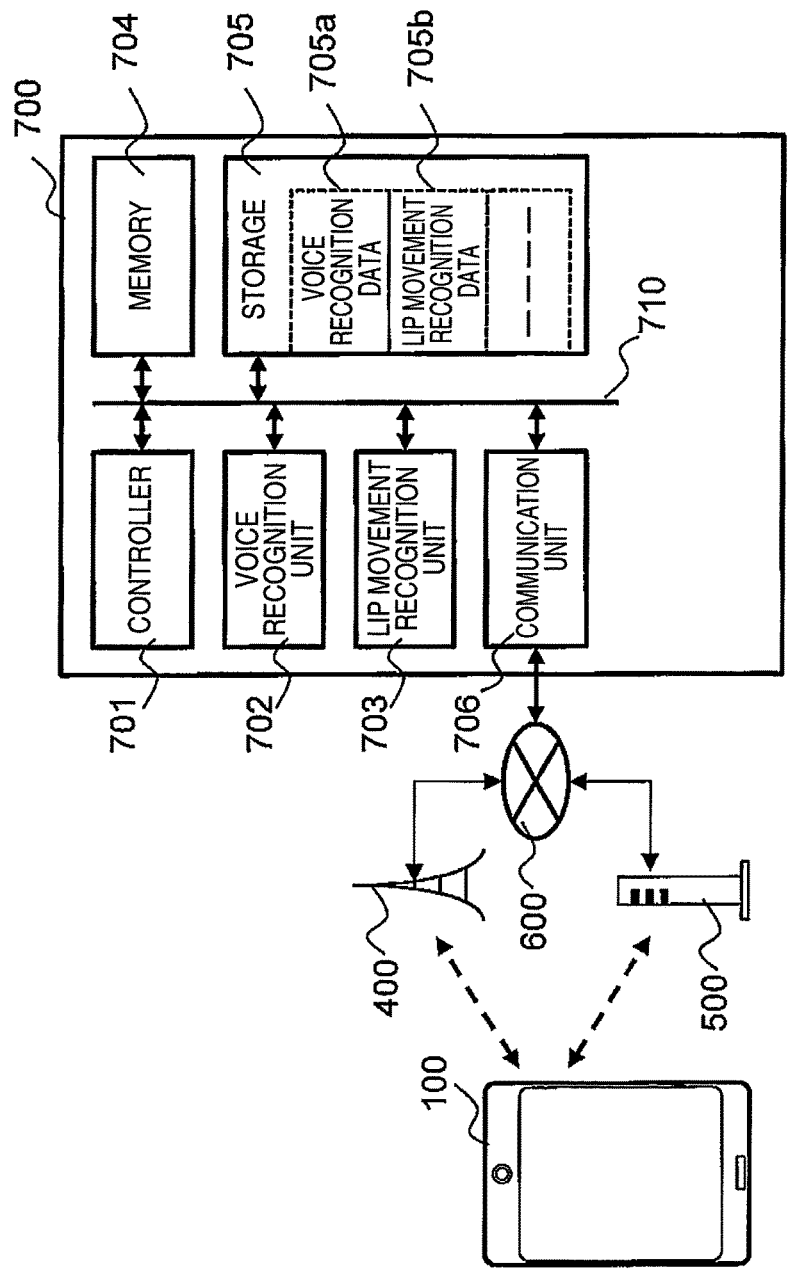
FIG. 31 is a block diagram showing a schematic configuration of an information processing system including a portable terminal according to the third embodiment of the present invention and a voice/lip movement recognition server.

In FIG. 31, the voice/lip movement recognition server 700 includes a controller 701, a voice recognition unit 702, a lip movement recognition unit 703, a memory 704, a storage 705, and a communication unit 706, and each of them are connected to a bus 710 each other.

The communication unit 706 is an interface for connecting to the external network 600, and is connected to the portable terminal device 100 through the base station 400 or the wireless router 500.

The controller 701 is formed of a CPU and the like, and controls respective constituting units and executes various processes by executing programs stored in the memory 704.

The voice recognition unit 702 is for recognizing the voice data of the operator of the portable terminal device 100 obtained through the communication unit 706, and converting the same to a character string corresponding to the voice data. Also, the lip movement recognition unit 703 is for recognizing the lip movement from the image data of the operator of the portable terminal device 100 obtained through the communication means 706, and converting the same to a character string corresponding to the image data. The controller 701 transmits the result recognized from the voice of the operator or the result recognized from the lip movement of the operator to the portable terminal device 100 through the communication unit 706.

The memory 704 is a flush memory and the like, and stores programs, data, and the like. The storage 705 is an SSD (Solid State Device) or a hard disk, and the data used for recognition in the voice recognition unit 702 and the lip movement recognition unit 703 described above is stored in predetermined areas 705a and 705b of the storage 705.

Figure 32A:
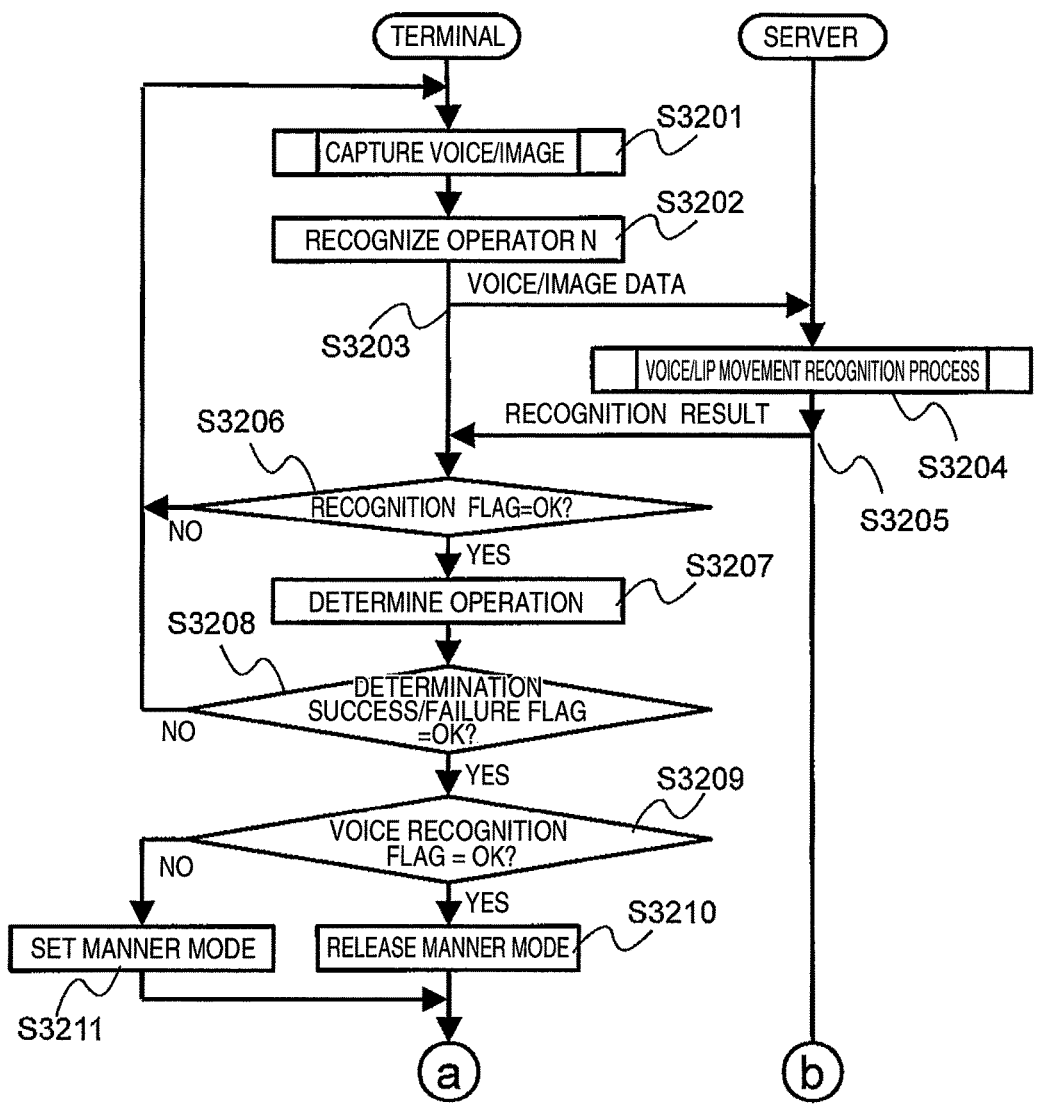
FIG. 32(a) is a flowchart showing an example of the process of the information processing system of the present invention.

FIG. 32 is a flowchart showing an example of the process of the controller 101 and the controller 701 in the information processing system that includes the portable terminal device 100 and the voice/lip movement recognition server 700 of FIG. 31.

In FIG. 32, first, in the portable terminal device 100, the voice is captured from the microphone 112 through the audio processor 113, and the image including at least the lip portion of the operator is captured from the imaging unit 120 through the image processing unit 119 (S3201). The operator N who operates is recognized by the operator recognition unit 122 based on the voice and/or image captured in the voice/image capturing process S3201 and the operator recognition data stored in the memory area 104d (S3202).

Next, the data of the voice and image captured is transmitted to the voice/lip movement recognition server 700 through the base station communication unit 110 or the wireless communication unit 111 (S3203). In the voice/lip movement recognition server 700, a voice and lip movement recognition process S3204 is executed based on the data of the voice and image received, and the recognition result is transmitted to the portable terminal device 100 through the communication unit 706 (S3205). In S3206, a branch process is executed based on the voice recognition flag and the lip movement recognition flag of the recognition result transmitted from the voice/lip movement recognition server 700, and, when the voice recognition and the lip movement recognition have failed (No), the process returns to the voice/image capturing process S3201. When the voice recognition or the lip movement recognition has been successful (Yes), an operation determination process S3207 is executed, which operation is to be executed is determined based on the likelihood of the option data on the operations shown in FIG. 3 stored in the memory 104c and the recognition result, and, when there exists an operation option corresponding to the recognition result, a determination success/failure flag is set to OK. In a branch process 3408, a branch process is executed by the determination success/failure flag, and, when an operation option corresponding to the recognition result does not exist (No), the process returns to the voice/image capturing process S3201. When there exists an operation option corresponding to the recognition result (Yes), a branch process is executed based on the voice recognition flag in a branch process 53209. The manner mode is released (S3210) when the voice recognition has been successful (Yes), and the manner mode is set (S3211) when the voice recognition has failed (No).

Next, a branch process is executed according to whether selection of the object of the operation is needed or not (S3212). For example, when "music reproduction" is to be executed as the operation, selection of the object (music piece and the like) of operation (music reproduction and the like) becomes necessary such as which music piece is to be reproduced. Also, when "stop" is to be executed as the operation during music reproduction, selection of the object of the operation (stop and the like) is not necessary. When there is not selection of the operation object (No), the determined operation is executed (S3228). When it is determined in the branch process S3212 that there is an operation selection (Yes), a voice/image capturing process S3213 is executed, and the data of the voice and image captured is transmitted to the voice/lip movement recognition server 700 (S3214). In the voice/lip movement recognition server 700, a voice and lip movement recognition process S3215 is executed based on the data of the voice and image received, and the recognition result is transmitted to the portable terminal device 100 (S3216). In S3217, a branch process is executed based on the voice recognition flag and the lip movement recognition flag of the recognition result transmitted from the voice/lip movement recognition server 700, and, when the voice recognition and the lip movement recognition have failed (No), the process returns to the voice/image capturing process S3213. When the voice recognition or the lip movement recognition has been successful (Yes), an operation category determination process S3218 is executed, the category of the operation object is determined based on the likelihood of category option data corresponding to the operation as shown in FIG. 13 stored in the memory 104c and the recognition result, and, when there exists a category option corresponding to the recognition result, the determination success/failure flag is set to OK. In a branch process 3418, a branch process is executed by the determination success/failure flag, and, when the category option corresponding to the recognition result does not exist (No), the process returns to the voice/image capturing process S3213. When there exists the category option corresponding to the recognition result (Yes), a voice/image capturing process S3220 is executed, and the data of the voice and image captured is transmitted to the voice/lip movement recognition server 700 (S3221). In the voice/lip movement recognition server 700, a voice and lip movement recognition process S3222 is executed based on the data of the voice and image received, and the recognition result is transmitted to the portable terminal device 100 (S3223). In S3224, a branch process is executed based on the voice recognition flag and the lip movement recognition flag of the recognition result transmitted from the voice/lip movement recognition server 700, and, when the voice recognition and the lip movement recognition have failed (No), the process returns to the voice/image capturing process 3220. When the recognition has been successful (Yes), an operation object determination process S3225 is executed. In a memory 104e of the portable terminal 100, history data of each operator has been stored, and the history of the words and the like of the retrieval object when internet retrieval was performed by voice recognition has been stored. Also, to the data such as music and photo stored in the storage 105 of the portable terminal device 100, metadata on the attribute such as the title, artist, and filming date has been imparted. The operation object is determined based on the likelihood of the description of the history data stored in the memory 104e and the attribute portion of the category determined by the operation category determination process S3218 (for example, the description corresponding to the title of the music piece recorded as the metadata of each music data when the name of the music piece has been selected as the category) and the recognition result, and, when there exists an operation object corresponding to the recognition result, the determination success/failure flag is set to OK. In a branch process 3426, a branch process is executed by the determination success/failure flag, and, when an operation object corresponding to the recognition result does not exist (No), the process returns to the voice/image capturing process S3220. When there exists an operation object corresponding to the recognition result (Yes), the determined operation object is added/renewed with respect to the history data corresponding to the operator N stored in the memory 104e (S3227), and operation is executed for the determined operation object (S3228).

An example of the flowchart of the voice/lip movement recognition processes S3204, S3215, and S3222 is shown in FIG. 33. In FIG. 33, first, a voice recognition process S3301 is executed by the voice recognition unit 702 based on the voice data of the operator and the image data including at least the lip portion acquired through the communication unit 706, and a lip movement recognition process S3302 is executed by the lip movement recognition unit 703. In a branch process S3303, whether the voice recognition has been successful is determined by the voice recognition flag in the voice recognition process S3301. When the voice recognition has failed (No), the process is finished. When the voice recognition has been successful (Yes), whether the image has been captured without that the lip portion departs from the imaging range and acquisition of the lip movement data has been successful is determined by the lip detection flag in a branch process S3304. When acquisition of the lip movement data has been successful (Yes), a branch process is executed by whether or not there is the lip recognition data corresponding to the character string obtained by the voice recognition. When there is the lip recognition data corresponding to the character string obtained by the voice recognition (Yes), the lip recognition data of the storage area 705b corresponding to the character string is renewed (S3306), and, when the lip recognition data does not exist (No), the lip recognition data corresponding to the character string obtained by the voice recognition is added to the storage area 705b (S3307), and the process is finished. On the other hand, when it is determined in the branch process S3304 that acquisition of the lip movement data has failed (No), the lip movement recognition data is not renewed, and the process is finished.

By the processes described above, when the voice recognition has been successful and acquisition of the lip movement data has been successful, renewal and addition of the lip movement recognition data corresponding to the voice recognition result are executed.

Figure 34:
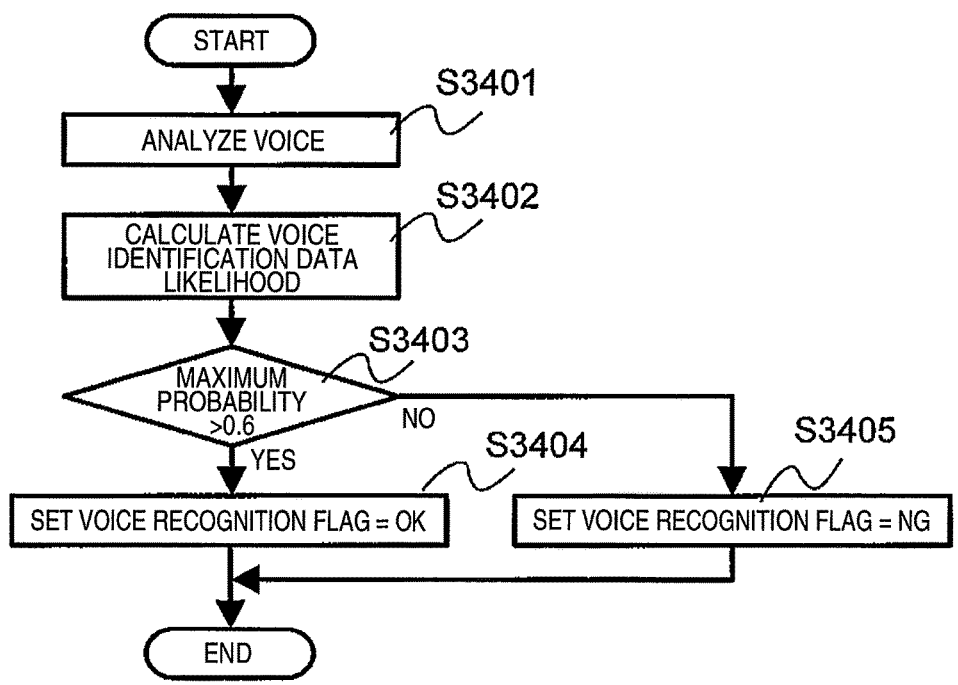
FIG. 34 is a flowchart showing an example of the voice recognition process in the voice/lip movement recognition server.

An example of the flowchart of the voice recognition process S3301 is shown in FIG. 34. In FIG. 34, first, the voice analysis is executed, and the time series pattern of the characteristic parameter of the input voice is extracted (S3401). Next, the likelihood for the voice recognition data stored in the predetermined area 705a of the storage as an acoustic model by HMM is calculated (S3402). In a branch process S3403, when the maximum probability (maximum likelihood) of the result of the likelihood calculation is equal to or greater than a predetermined value (here, the value is set to 0.6 as an example) (Yes), the voice recognition flag is set to OK (S3404), the voice recognition data that gives the maximum probability is made the recognition result, and the process is finished. On the other hand, when it is determined to be No in the branch process S3403, it is determined that the voice recognition has failed due to the noise and the like, the voice recognition flag is set to NG (S3405), and the process is finished.

Next, the lip movement recognition process S3302 will be described using an example of FIG. 35.

In the flowchart of FIG. 35, first, the lip movement is detected from the image inputted, and the lip movement data is acquired (S3501). When the lip portion has departed from the imaging range, the lip portion cannot be detected from the image inputted, and acquisition of the lip movement data has failed in the lip movement data acquisition process S3501, it is determined to be No in a branch process 3702, the lip detection flag and the lip movement recognition flag are set to NG (S3503, S3508), and the process is finished. On the other hand, when acquisition of the lip movement data from the image inputted has been successful, it is determined to be Yes in a branch process 53502, and the lip detection flag is set to OK (S3504). Next, the likelihood of the lip movement data acquired and the lip movement recognition data stored in the predetermined area 705b of the storage is calculated (S3505). In a branch process 53506, when the maximum probability (maximum likelihood) of the result of the likelihood calculation is equal to or greater than a predetermined value (here, the value is set to 0.6 as an example) (Yes), the lip movement recognition flag is set to OK (S3507), and the lip movement recognition data that gives the maximum probability is made the recognition result, and the process is finished. On the other hand, when it is determined to be No in the branch process 53506, the lip movement recognition flag is set to NG (S3508), and the process is finished.

Although it is configured in the embodiment described above that the voice and the image data captured in the portable terminal device 100 are transmitted to the voice/lip movement recognition server 700, it may also be configured that the voice analysis for extracting the time series pattern of the characteristic parameter of the input voice is executed in the portable terminal device 100 and the result of detecting the lip movement from the image inputted and acquiring the lip movement data is transmitted to the voice/lip movement recognition server 700. Thereby, the data amount transmitted from the portable terminal device 100 to the voice/lip movement recognition server 700 can be reduced, and the processing time can be reduced.

In the embodiments described above, by executing the voice recognition and the lip movement recognition by the voice/lip movement recognition server 700, the lip movement recognition data is renewed based on the data of the voice and lip movement of a number of operators, and therefore the accuracy of the lip movement recognition can be further improved. Also, by arranging the history data for each operator, adding the words and the like newly used in the voice recognition as the history data, and utilizing the history data in the lip movement recognition, lip movement recognition of the words with high use frequency for each operator of the portable terminal device becomes possible.

Also, the embodiments described above were described in detail in order to facilitate easy understanding of the present invention, and the present invention is not necessarily limited to those including all configurations described. For example, although the voice recognition data, lip movement recognition data, and option data were stored in the memory 104 in the first and second embodiments, they may be stored in the storage 105. Further, a part of the configuration of an embodiment can be replaced by a configuration of another embodiment, and a configuration of an embodiment can be added with a configuration of another embodiment. Furthermore, with respect to a part of the configuration of each embodiment, it is possible to effect addition, deletion, and replacement of other configurations.

Also, with respect to each configuration, function, processor, processing means and the like described above, a part or all thereof may be achieved by hardware by designing by an integrated circuit and so on for example. Further, each configuration, function, and the like described above may be achieved by software by that a processor interprets and executes a program that achieves the function of them. Information such as a program, table, and file achieving each function can be placed in the memory 104 and the storage 105.

Also, with respect to the control line and information line, those considered to be necessary for explanation have been shown, and all control lines and information lines applicable to products have not necessarily been shown. Practically, it may be thought that almost all configurations are connected to each other.

REFERENCE SIGNS LIST

100: portable terminal device, 101: controller, 102: voice recognition unit, 103: lip movement recognition unit, 104: memory, 105: storage, 110: base station communication unit, 111: wireless communication unit, 112: microphone, 113: audio processor, 114: speaker, 115: external voice output unit, 116: touch panel, 117: operation input unit, 118: display, 119: image processing unit, 120: imaging unit, 122: operator recognition unit, 400: base station, 500: wireless router, 600: external network, 700: voice/lip movement recognition server, 701: controller, 702: voice recognition unit, 703: lip movement recognition unit, 705: storage, 706: communication unit

The invention claimed is:

1. A portable terminal device comprising:
a camera that captures images of an operator;
a microphone that captures a voice of the operator;
a controller which is programmed to execute a plurality of operations;
a communication interface that transmits and receives data with an external server; and
wherein the controller is further programmed to:
when the images are obtained from the camera and the voice is obtained from the microphone, identify if the operator is a specific operator registered beforehand based on at least one of the obtained images and the obtained voice,
when the operator is identified as the specific operator, control the communication interface to transmit data including temporal changes of a lateral size and a vertical size of a lip of the specific operator in the obtained images and the obtained voice to the external server, and
when the communication interface receives information from the external server including one or more results identified by the external server based on the transmitted temporal changes of the lateral size and the vertical size of the lip of the specific operator,
wherein, when only one result is identified by the external server in the received information, the controller is further programmed to execute the operation corresponding to the one result identified by the external server,
wherein when a plurality of results are identified by the external server in the received information, the controller is further programmed to:

display the plurality of results as a plurality of candidates,
capture additional images from the camera including at least the lip of the specific operator during the display of the candidates,
acquire lip movement data of the additional images,
determine one of the plurality of candidates based on the lip movement data, and
execute the operation corresponding to the determined one of the candidates.

2. The portable terminal device according to claim 1, further comprising:
a speaker,
wherein the controller is further programmed to:
restrict output from the speaker, and
control the speaker to output audio of a voice associated with the operation based on the information received from the external server when the output from the speaker is restricted.

3. An information processing system comprising:
a portable terminal device; and
a server connected over a network to the portable terminal device,
wherein the portable terminal device includes:
a camera that captures images of an operator,
a microphone that captures a voice of the operator,
a first controller that is programmed to execute a plurality of operations, and
a first communication interface that transmits and receives data with the server,
wherein the first controller is further programmed to:
when the images are obtained from the camera and the voice is obtained from the microphone, identify if the operator is a specific operator registered beforehand based on at least one of the obtained images and the obtained voice,
when the operator is identified as the specific operator, control the communication interface to transmit image data including temporal changes of a lateral size and a vertical size of a lip of the specific operator in the obtained images and voice data of the obtained voice to the server,
wherein the server includes:
a second communication interface that receives the voice data and the image data from the portable terminal device; and
a second controller that, in performing the voice recognition, is programmed to:
identify one or more of the operations based on the voice data and the image data including the temporal changes of the lateral size and the vertical size of the lip of the specific operator received from the portable terminal device, and
control the second communication interface to transmit one or more identification results of the one or more operations to the portable terminal device, and
wherein, when only one identification result is identified by the server, the first controller is further programmed to execute the operation corresponding to the one identification result received from the server,
wherein, when a plurality of identification results are identified by the external server, the first controller is further programmed to:
display the plurality of identification results as a plurality of candidates,
capture additional images from the camera including at least the lip of the specific operator during the display of the candidates,
acquire lip movement data of the additional images,
determine one of the plurality of candidates based on the lip movement data, and
execute the operation corresponding to the determined one of the candidates.

4. The information processing system according to claim 3,
wherein the portable terminal device further includes a speaker, and
wherein the first controller is further programmed to:
restrict output from the speaker, and
control the speaker to output audio of a voice associated with the operation based on the identification result received from the server when the output from the speaker is restricted.

* * * * *